(12) United States Patent
Inoue et al.

(10) Patent No.: US 9,819,027 B2
(45) Date of Patent: Nov. 14, 2017

(54) METHOD FOR PRODUCING BATTERY AND BATTERY

(75) Inventors: Toshihiko Inoue, Miyoshi (JP); Masaharu Miyahisa, Fujisawa (JP); Hajime Konishi, Ikoma (JP); Koichi Toriyama, Osaka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 423 days.

(21) Appl. No.: 14/410,645

(22) PCT Filed: Jun. 28, 2012

(86) PCT No.: PCT/JP2012/066564
§ 371 (c)(1),
(2), (4) Date: Dec. 23, 2014

(87) PCT Pub. No.: WO2014/002227
PCT Pub. Date: Jan. 3, 2014

(65) Prior Publication Data
US 2015/0147598 A1    May 28, 2015

(51) Int. Cl.
*B23K 20/00*    (2006.01)
*H01M 4/66*    (2006.01)
(Continued)

(52) U.S. Cl.
CPC ............ *H01M 4/661* (2013.01); *H01M 2/26* (2013.01); *H01M 4/0471* (2013.01); *H01M 4/70* (2013.01);
(Continued)

(58) Field of Classification Search
CPC .... H01M 4/661; H01M 4/70; H01M 10/4235; H01M 4/0471; H01M 10/0431;
(Continued)

(56) References Cited

U.S. PATENT DOCUMENTS 5,524,406 A * 6/1996 Ragland ............... B23K 11/087
219/117.1
6,054,668 A * 4/2000 Van Otteren .......... B23K 11/14
219/108

(Continued)

FOREIGN PATENT DOCUMENTS

JP    6-155051    6/1994
JP    2000/82641    3/2000

(Continued)

OTHER PUBLICATIONS

Maeda et al. (JP, 2011-076838) (a raw machine translation) (Abstract, Detailed Description and Drawings).*

*Primary Examiner* — Kiley Stoner
(74) *Attorney, Agent, or Firm* — Finnegan, Henderson, Farabow, Garrett & Dunner, LLP

(57) ABSTRACT

A method for producing a battery resulting from the joining with a plurality of weld nuggets therebetween of a foil layered part, at which foil exposed portions exposing an aluminum foil overlap, and a positive terminal member made of aluminum, includes: a formation step for forming at the foil layered part a foil welded part at which are formed, by welding aluminum foils together by means of ultrasonic welding, a first high-position part at at least a section of a surface to be joined, and a plurality of first low-position parts distributed at scattered points within the first high-position part; and a resistance-welding step for contacting the first high-position part to the positive terminal member, generating weld nuggets at the first low-position part by flowing an electric current, and resistance-welding the foil welded part and the positive terminal member with the weld nuggets therebetween.

12 Claims, 16 Drawing Sheets

(51) Int. Cl.
| | |
|---|---|
| *H01M 2/26* | (2006.01) |
| *H01M 10/04* | (2006.01) |
| *H01M 4/04* | (2006.01) |
| *H01M 10/42* | (2006.01) |
| *H01M 4/70* | (2006.01) |
| *B23K 20/10* | (2006.01) |
| *H01M 2/34* | (2006.01) |
| *B23K 11/11* | (2006.01) |

(52) U.S. Cl.
CPC ... *H01M 10/0413* (2013.01); *H01M 10/0431* (2013.01); *H01M 10/4235* (2013.01); *B23K 11/115* (2013.01); *B23K 20/10* (2013.01); *H01M 2/263* (2013.01); *H01M 2/345* (2013.01); *H01M 2200/20* (2013.01); *Y10T 29/49108* (2015.01)

(58) Field of Classification Search
CPC .... H01M 10/0413; H01M 2/26; H01M 2/345; H01M 2200/20; H01M 2/263; B23K 11/115; B23K 1/06; B23K 20/20–20/106; B23K 9/007; B23K 10/022; B23K 11/10–11/12; Y10T 29/49108
USPC ............. 228/1.1, 110.1, 58, 901, 175, 176; 219/80, 86.1–94
See application file for complete search history.

(56) References Cited

U.S. PATENT DOCUMENTS

| | | | |
|---|---|---|---|
| 6,137,673 A | 10/2000 | Andou et al. | |
| 8,574,756 B1* | 11/2013 | Yokoyama | H01M 2/263 429/162 |
| 2001/0019797 A1* | 9/2001 | Kezuka | H01M 2/26 429/161 |
| 2006/0159987 A1 | 7/2006 | Kikuchi et al. | |
| 2007/0037054 A1 | 2/2007 | Kikuchi et al. | |
| 2009/0255908 A1* | 10/2009 | Sigler | B23K 11/115 219/91.2 |
| 2010/0027193 A1* | 2/2010 | Marumo | H01G 11/12 361/505 |
| 2010/0221602 A1* | 9/2010 | Itou | H01M 4/64 429/185 |
| 2010/0247992 A1* | 9/2010 | Miyata | B23K 26/206 429/94 |
| 2011/0039160 A1 | 2/2011 | Takahata et al. | |
| 2011/0076569 A1* | 3/2011 | Kimura | B23K 11/11 429/246 |
| 2012/0015225 A1* | 1/2012 | Hattori | H01M 2/0217 429/94 |
| 2012/0028088 A1* | 2/2012 | Hattori | H01M 2/0217 429/53 |
| 2012/0052354 A1 | 3/2012 | Hattori et al. | |
| 2013/0017438 A1* | 1/2013 | Taguchi | H01G 11/06 429/179 |
| 2013/0122345 A1* | 5/2013 | Sato | H01M 2/202 429/121 |
| 2013/0209849 A1* | 8/2013 | Hattori | H01M 2/26 429/94 |
| 2014/0045020 A1* | 2/2014 | Okutani | H01M 10/0563 429/94 |
| 2015/0056506 A1* | 2/2015 | Lilley | H01M 2/266 429/211 |
| 2015/0303441 A1* | 10/2015 | Takagi | H01M 2/22 429/61 |
| 2016/0087249 A1* | 3/2016 | Asano | H01M 4/70 429/162 |
| 2016/0118689 A1* | 4/2016 | Oguni | H01M 10/0568 429/199 |
| 2016/0126596 A1* | 5/2016 | Heishi | H01M 2/26 429/162 |

FOREIGN PATENT DOCUMENTS

| | | |
|---|---|---|
| JP | 2008-638 | 1/2008 |
| JP | 2009/259604 | 11/2009 |
| JP | 2010-184260 | 8/2010 |
| JP | 2010/282846 | 12/2010 |
| JP | 2011-233257 A | 11/2011 |
| KR | 10-2002-0064366 | 8/2002 |
| KR | 10-2012-0022071 | 3/2012 |

* cited by examiner

METHOD FOR PRODUCING BATTERY AND BATTERY

CROSS-REFERENCE TO RELATED APPLICATIONS

This application is a national phase application of International Application No. PCT/JP2012/066564, filed Jun. 28, 2014, the content of which is incorporated herein by reference.

TECHNICAL FIELD

The present invention relates to a battery including an electrode body having a foil layered part in which foil exposed portions of an aluminum foil of a positive electrode sheet are layered in a thickness direction, and a positive terminal member made of aluminum and resistance-welded to the foil layered part, and a method for producing the battery.

BACKGROUND ART

Recently, a chargeable-dischargeable battery is utilized as drive power sources of vehicles such as a hybrid car and an electric car or portable electronic devices such as a note-sized personal computer and a video camcorder. As a technique used for such a battery, for example, Patent Document 1 discloses a joining method of resistance-welding layered aluminum foils to a base plate made of aluminum. To be concrete, this joining method includes an ultrasonic tack welding step of forming a tack weld part in which a plurality of layered aluminum foils are tack welded by ultrasonic welding and a resistance welding step of resistance-welding the tack weld part to the base plate by clamping these tack weld part and base plate between two electrodes and then energizing the electrodes.

RELATED ART DOCUMENTS

Patent Documents

Patent Document 1: JP-A-2010-184260

SUMMARY OF INVENTION

Problems to be Solved by the Invention

Meanwhile, when two metal members are to be resistance-welded, generally, these two metal members are welded so that nuggets are formed therebetween (a region made of parts of the two metal members that are melted, mixed, and solidified). If the nuggets formed are small in size, the welding strength between two metal members is low. Thus, there is a demand for forming large nuggets to enhance welding strength. On the other hand, if the nuggets are too large, a large amount of molten metal may be expelled from a nugget or nuggets, forming voids, leading to a decrease in welding strength, conversely.

In each of the surface of the tack weld part (foil layered part) and the surface of the base plate (the positive terminal member), used in the aforementioned joining method disclosed in Patent Document 1, a high-resistive oxide layer or coating (alumina layer or coating) is present. To supply electric current to the tack weld part and the base plate to weld them, it is necessary to break part of the oxide layer or coating on each surface and apply high voltage between electrodes for resistance welding.

On the other hand, in the joining method in Patent Document 1, since all contact surfaces of the tack weld part and the base plate are flat, it is difficult to fix a welding spot (a portion to which electric current will be applied) and further the electric current is likely to flow with concentration on one portion on which the oxide coating or layer is initially broken. In addition, large electric current resulting from high voltage will flow through the tack weld part and the base plate, and thus only one nugget is apt to become large at once. Accordingly, part of the tack weld part or part of the base plate, which are not melted, around the nugget is made thin in thickness and liable to be broken. A large amount of molten aluminum is therefore likely to be expelled from the nugget to the outside of the tack weld part or the base part. This results in difficulty in enhancing welding strength between the tack weld part and the base plate.

The present invention has a purpose to provide a battery providing good welding strength enhanced between a foil layered part of an electrode body and a terminal member while resistance-welding them, and a method for producing the battery.

Means of Solving the Problems

To achieve the above purpose, one aspect of the invention provides a method for producing a battery including: an electrode body including a positive electrode sheet having an aluminum foil, the positive electrode sheet including a foil layered part formed of a foil exposed portions exposing the aluminum foil, the foil exposed portions being overlapped in a thickness direction; and a positive terminal member made of aluminum and resistance-welded to the foil layered part, the foil layered part and the positive terminal member being joined to each other through a plurality of nuggets distributed in a scattered-point pattern in an expanding direction of the aluminum foil, wherein the method includes: a forming step of forming, in the foil layered part, a foil welded part made of an aluminum foil overlapped and welded to each other in the thickness direction by ultrasonic welding, the foil welded part being formed with a first high-position part located at a high position on one side in the thickness direction and a plurality of low-position parts positioned at a lower position than the first high-position part, the low-position parts being distributed in a scattered-point pattern within the first high-position part, in at least part of a to-be-joined surface on the one side in the thickness direction of surfaces of the foil welded part; and a resistance-welding step of placing the first high-position part into contact with the positive terminal member, applying electric current to the terminal member to generate the nugget in the first low-position part, and resistance-welding the foil welded part of the electrode body and the terminal member through the nugget.

In a resistance-welding step of the aforementioned battery producing method, the first high-position parts of the foil welded part are placed in contact with the positive terminal member and electric current is applied thereto to generate nuggets in the first low-position part.

The reason why the nuggets are generated in the first low-position parts is conceived as below. Specifically, the aluminum foils of the first high-position parts of the foil welded part are not so strongly pressed against each other in a height direction (a thickness direction of the aluminum foil) to the extent of those in the first low-position parts, and thus they are not layered or overlapped in tight contact fashion. Therefore, during resistance-welding, conceivably, electric current does not easily flow through the inside of the first high-position parts relatively in a height direction (thickness direction). The electric current applied to the first high-position part will travel to the first low-position part through the aluminum foil forming a side surface or a slant surface positioned between the first high-position part and the first low-position part, and travels in this first low-position part in the height direction (or travels back along this route). During resistance-welding, accordingly, the electric current flows with concentration in the side surface or the slant surface surrounding the first low-position part, thereby melting this portion and the first low-position part.

In the resistance-welding, welding is performed while the first high-position parts are held in contact with the positive terminal member. Thus, the first high-position parts are pressed in the height direction, thinning each of the aluminum foils forming the first high-position parts, whereas material (aluminum) is extruded by just that much in an expanding direction to the surrounding of the first high-position parts. The extruded aluminum is melted in the side surface or the slant surface between the first high-position part and the first low-position part mentioned above, thus generating nuggets.

The nuggets thus generated between the foil welded part and the positive terminal member bond the foil layered part and the positive terminal member at multiple points. Accordingly, there is little risk that molten aluminum will be expelled from the nuggets. Even if expelled, it is restricted to only a small amount. Even though using the resistance-welding, it is possible to produce a battery with good welding strength ensured between the foil layered part and the positive terminal member.

The forming step may include a step of welding the aluminum foils to each other by ultrasonic welding to form the foil welded part and then providing the first high-position parts or the first low-position parts in the to-be-joined surface by press. Also, there may be a step of welding the aluminum foils to each other by ultrasonic welding using a horn or anvil having an uneven shape (projections and depressions) and simultaneously providing the first high-position parts and the first low-position part in the to-be-joined surface. As the first low-position parts, there are for example a conical recess, a polygonal pyramid-shaped recess such as a pyramid (square pyramid), and a frustum shape recess such as a square frustum. The configuration that a plurality of the first low-position parts are scattered within the first high-position parts may include for example a configuration that the first low-position parts are arranged in a lattice pattern or a radial pattern.

In the above method for producing a battery, preferably, the forming step includes forming the foil welded part formed with second high-position parts located at a high position on the other side in the thickness direction and a plurality of second low-position parts formed at a lower position than the second high-position part, the second low-position parts being distributed in a scattered-point pattern within the second high-position parts, in at least part of an electrode-side surface positioned on the other side in the thickness direction of the surfaces of the foil welded part, an electrode for resistance-welding being placed in contact with the electrode-side surface, and the resistance-welding step includes pressure collapsing the second high-position parts in the thickness direction by the resistance-welding electrode.

As the second low-position parts, for example, there are adopted a conical recess, a polygonal pyramid-shaped recess such as pyramid (square pyramid), and a frustum-shaped recess such as square frustum. The second low-position parts may be configured as the same shape as or a different shape from the aforementioned first low-position parts. The configuration that the plurality of second low-position parts are distributed in the scattered-point pattern within the second high-position parts may include for example a configuration that the second low-position parts are arranged in a lattice pattern and in a radial pattern.

It is preferable to arrange the plurality of first low-position parts in a lattice pattern within the first high-position parts and arrange the plurality of second low-position parts in a lattice pattern within the second high-position part and set a pitch between the second low-position parts (a second pitch P2 mentioned later) to be smaller than a pitch between the first low-position parts (a first pitch P1 mentioned later) (P2<P1).

In the above method for producing a battery, preferably, the plurality of first low-position parts are arranged in a lattice pattern within the first high-position parts, the plurality of second low-position parts are arranged in a lattice pattern within the second high-position part, and a second pitch between the second low-position parts is smaller than a first pitch between the first low-position parts.

In one of the above methods for producing a battery, preferably, the battery has a ratio M/T in a range of 0.20 to 0.80, where a maximum size in the thickness direction of the nugget is M and a thickness of the foil layered part is T.

In one of the above methods for producing a battery, preferably, the battery is a sealed battery including the electrode body hermetically sealed in a battery case, and the positive terminal member includes a pressure-type current cutoff mechanism configured to cut off flow of electric current to the electrode body when internal pressure of the battery case rises.

Furthermore, another aspect of the invention provides a battery including: an electrode body including a positive electrode sheet having an aluminum foil, the positive electrode sheet including a foil layered part formed of foil exposed portions exposing the aluminum foil, the foil exposed portions being overlapped in a thickness direction; and a positive terminal member made of aluminum and resistance-welded to the foil layered part, the foil layered part and the positive terminal member being joined to each other through a plurality of nuggets distributed in a scattered-point pattern in an expanding direction of the aluminum foil.

In the above battery, further preferably, the foil layered part includes a foil welded part made of an aluminum foil welded to each other in the thickness direction by ultrasonic welding, and at least part of the foil welded part is resistance-welded to the positive terminal member through the plurality of nuggets.

In one of the above batteries, further preferably, the battery has a ratio M/T in a range of 0.20 to 0.80, where a maximum size in the thickness direction of the nugget is M and a thickness of the foil layered part is T.

In one of the above batteries, further preferably, the battery is a sealed battery including the electrode body hermetically sealed in a battery case, and the positive terminal member includes a pressure-type current cutoff mechanism configured to cut off flow of electric current to the electrode body when internal pressure of the battery case rises.

MODE FOR CARRYING OUT THE INVENTION

Embodiment

Figure 1:
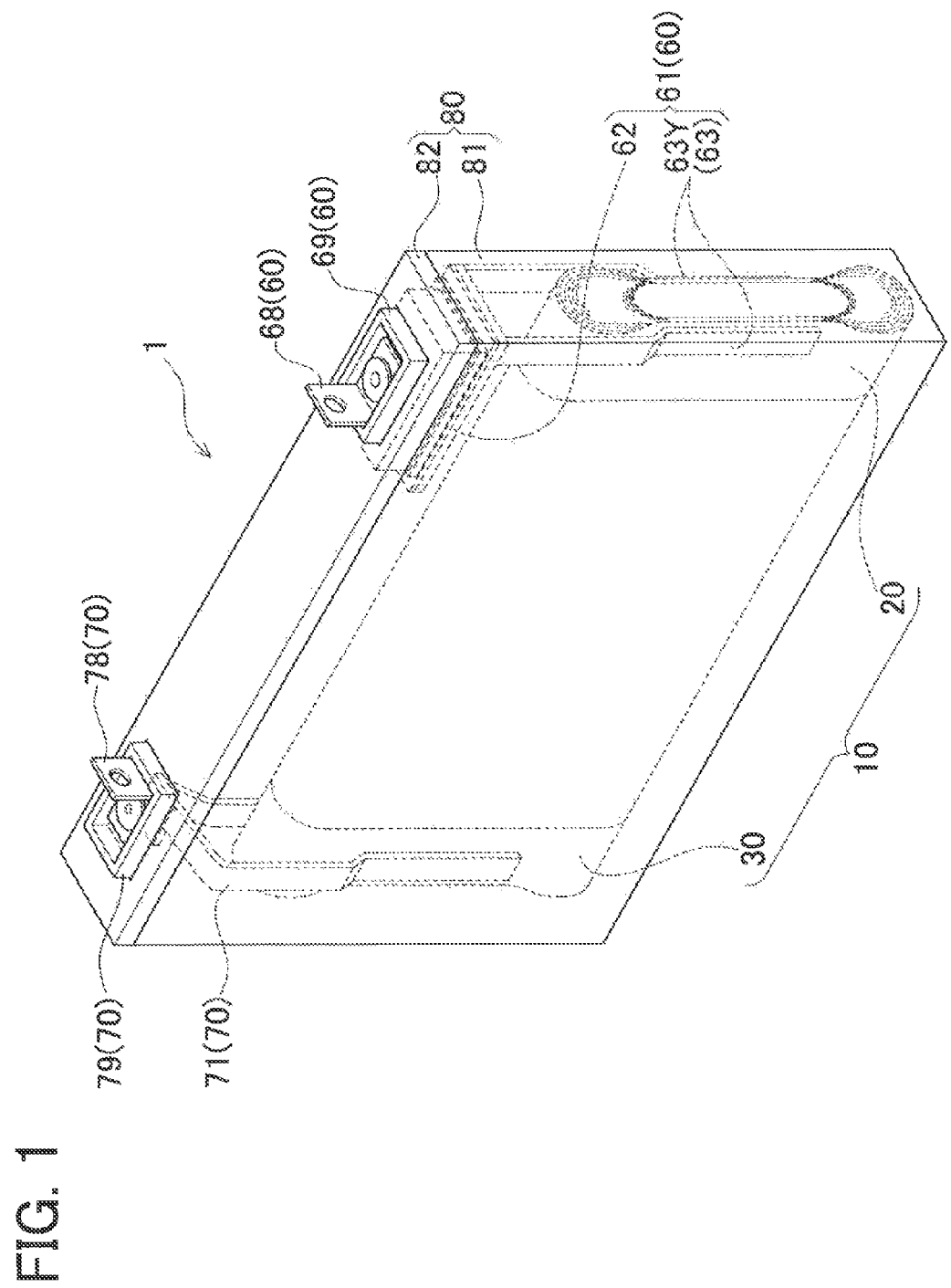
FIG. 1 is a perspective view of a battery in an embodiment (Examples 1 to 6)

A detailed description of Example 1 of an embodiment of the present invention will now be given referring to the accompanying drawings. A battery 1 in Example 1 will be first explained. This battery 1 is a sealed lithium ion secondary battery including a flat wound electrode body 10, a positive terminal structure 60 resistance-welded to a positive electrode sheet 20 (mentioned later) forming the electrode body 10, and a battery case 80 enclosing the electrode body 10 (see FIGS. 1 and 2). In addition, the battery 1 further includes a negative terminal structure 70 bonded (resistance-welded) to a negative electrode sheet 30 (mentioned later) forming the electrode body 10. The positive terminal structure 60 of the battery 1 has a current cutoff mechanism 62 (mentioned later) configured to cut off or interrupt application of electric current to the electrode body 10 when the internal pressure of a battery case 80 rises (see FIGS. 1 and 2).

The battery case 80 forming the battery 1 includes a case body 81 and a closing lid 82, each of which is made of aluminum. The case body 81 has a bottom-closed rectangular box-like shape, in which an insulating film (not shown) made of resin and folded like a box is interposed between the case body 81 and the electrode body 10. The closing lid 82 has a rectangular plate-like shape and is welded to the case body 81 to close an opening of the case body 81.

Figure 2:
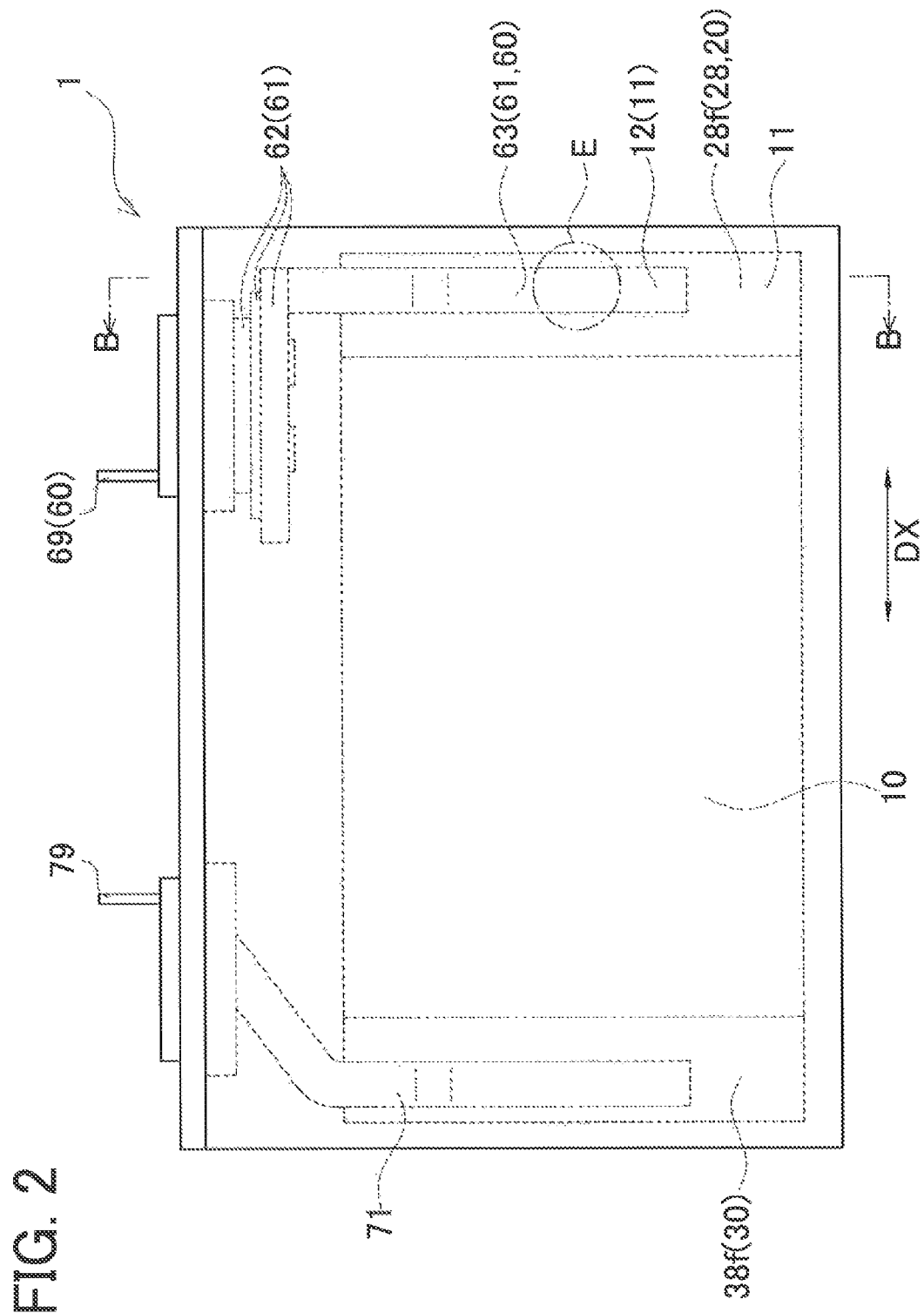
FIG. 2 is a plan view of the battery in the embodiment (Examples 1 to 6)

The negative terminal structure 70 includes a negative inner terminal member 71 made of copper and placed mainly in the battery case 80, a negative outer terminal member 78 made of copper and placed outside of the battery case 80, and a gasket 79 made of insulating resin (see FIGS. 1 and 2). The gasket 79 is interposed to provide insulation between the negative outer terminal member 78 and the battery case 80 and between the negative inner terminal member 71 and the battery case 80. The negative inner terminal member 71 is joined to a negative lead portions 38$f$ (mentioned later) of the negative electrode sheet 30 inside the battery case 80, while the inner terminal member 71 extends through the closing lid 82 of the battery case 80 and is electrically connected to the negative outer terminal member 78.

On the other hand, the positive terminal structure 60 mainly includes a positive inner terminal structure 61 placed in the battery case 80, a positive outer terminal member 68 made of aluminum and placed outside of the battery case 80, and an insulating resin gasket 69 (see FIGS. 1 and 2). This gasket 69 is interposed, as in the negative terminal structure 70, to provide insulation between the positive outer terminal member 68 and the battery case 80 and between the positive inner terminal structure 61 and the battery case 80.

The positive inner terminal structure 61 includes a joining member 63 bonded by resistance-welding to the positive foil welded part 12 (mentioned later) of the electrode body 10, and a known current cutoff mechanism 62 placed between the joining member 63 and the positive outer terminal member 68. This current cutoff mechanism 62 is configured to cut off the electric current flowing between the positive inner terminal structure 61 and the positive outer terminal member 68 when the inner pressure of the battery case 80 rises to an operating pressure or more.

Figure 4:
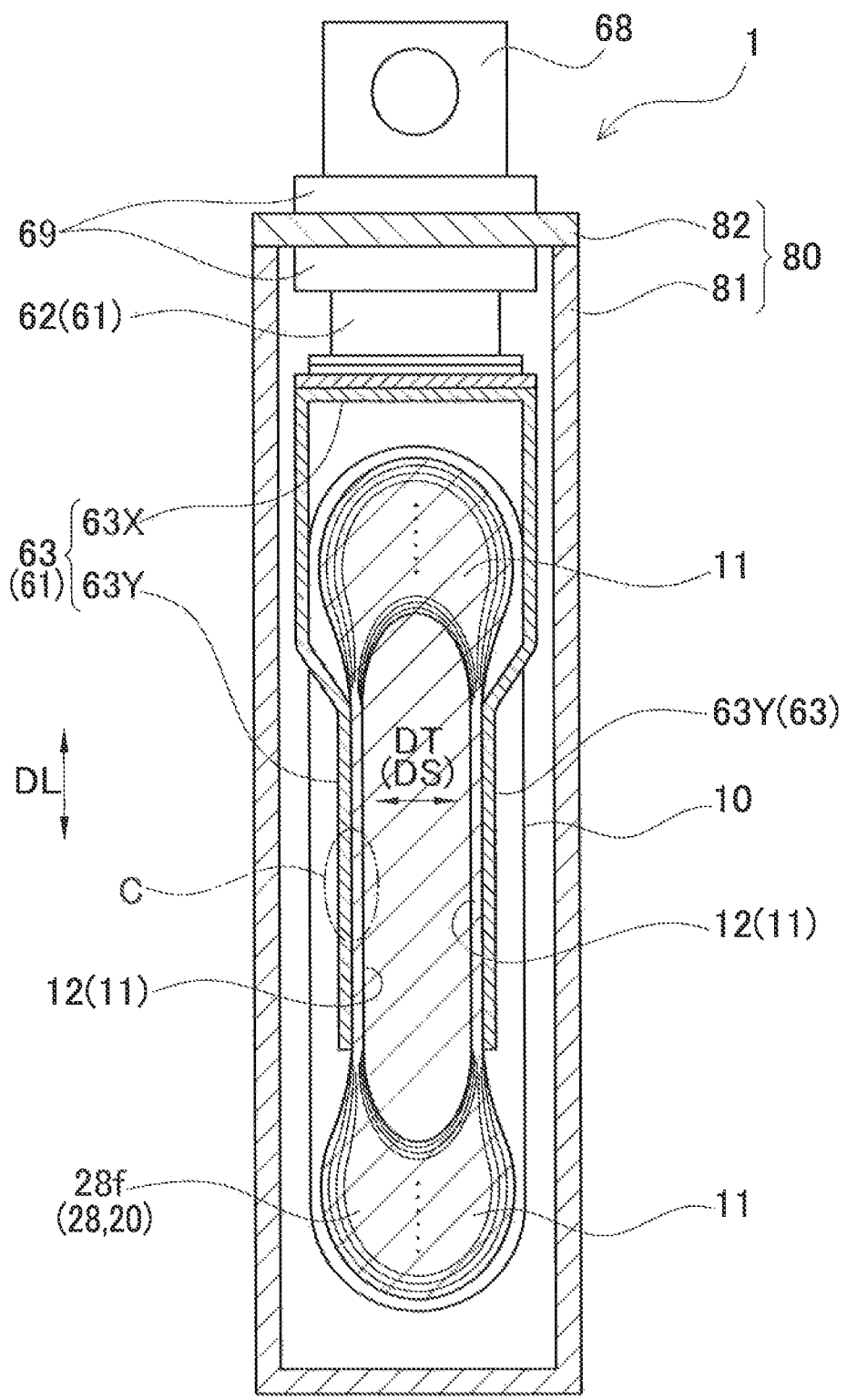
FIG. 4 is a cross sectional view (take along a line B-B in FIG. 2) of the battery in the embodiment (Examples 1 to 6)

The joining member 63 consists of a flat-plate-like main part 63X electrically connected to the current cutoff mechanism 62 and two rectangular band-plate-shaped joining parts 63Y, 63Y each extending from the main part 63X toward the electrode body 10, as shown in FIG. 4. The two joining parts 63Y, 63Y are placed in respective outer both sides of the flat-shaped electrode body 10 in a minor diameter direction (right-left direction in FIG. 4) and joined one each to positive foil welded parts 12 (mentioned later).

On the other hand, the electrode body 10 is formed of the positive electrode sheet 20 and the negative electrode sheet 30, each having a strip shape, that are wound together in a flat shape by interposing therebetween strip-shaped separators (not shown) made of polyethylene (see FIG. 1). The inside of this electrode body 10 is impregnated with an electrolyte (not shown) which is an organic solution added with $LiPF_6$. This electrolyte contains a gas-forming agent (biphenyl having a reaction potential of 4.5V vs. Li/Ki$^+$ in Example 1) that generates gas by oxidation decomposition reaction and polymerization reaction caused when the potential of the positive electrode sheet 20 becomes equal to or larger than a reaction potential of the sheet 20 itself. In Example 1, the gas-forming agent used herein has a reaction potential higher than the potential of the positive electrode sheet 20 (=4.1V vs. Li/Li$^+$) when the battery 1 in Example 1 is fully charged (a state of charge (SOC) of the battery 1 is SOC 100%). Thus, the battery 1 enters an overcharge state (the SOC of the battery 1 exceeds SOC 100%) and further generates gas in the battery case 80 when the potential of the positive electrode sheet 20 becomes equal to or larger than the reaction potential of the gas-forming agent. Accordingly, when the inner pressure Pi of the battery case 80 rises beyond the operating pressure of the current cutoff mechanism 62, flow of electric current (energization) to the electrode body 10 is cut off. Thus, in the battery 1 in Example 1, the electrode body 10 is deenergized during overcharge, thereby suppressing subsequent overcharge to the battery 1.

Figure 6:
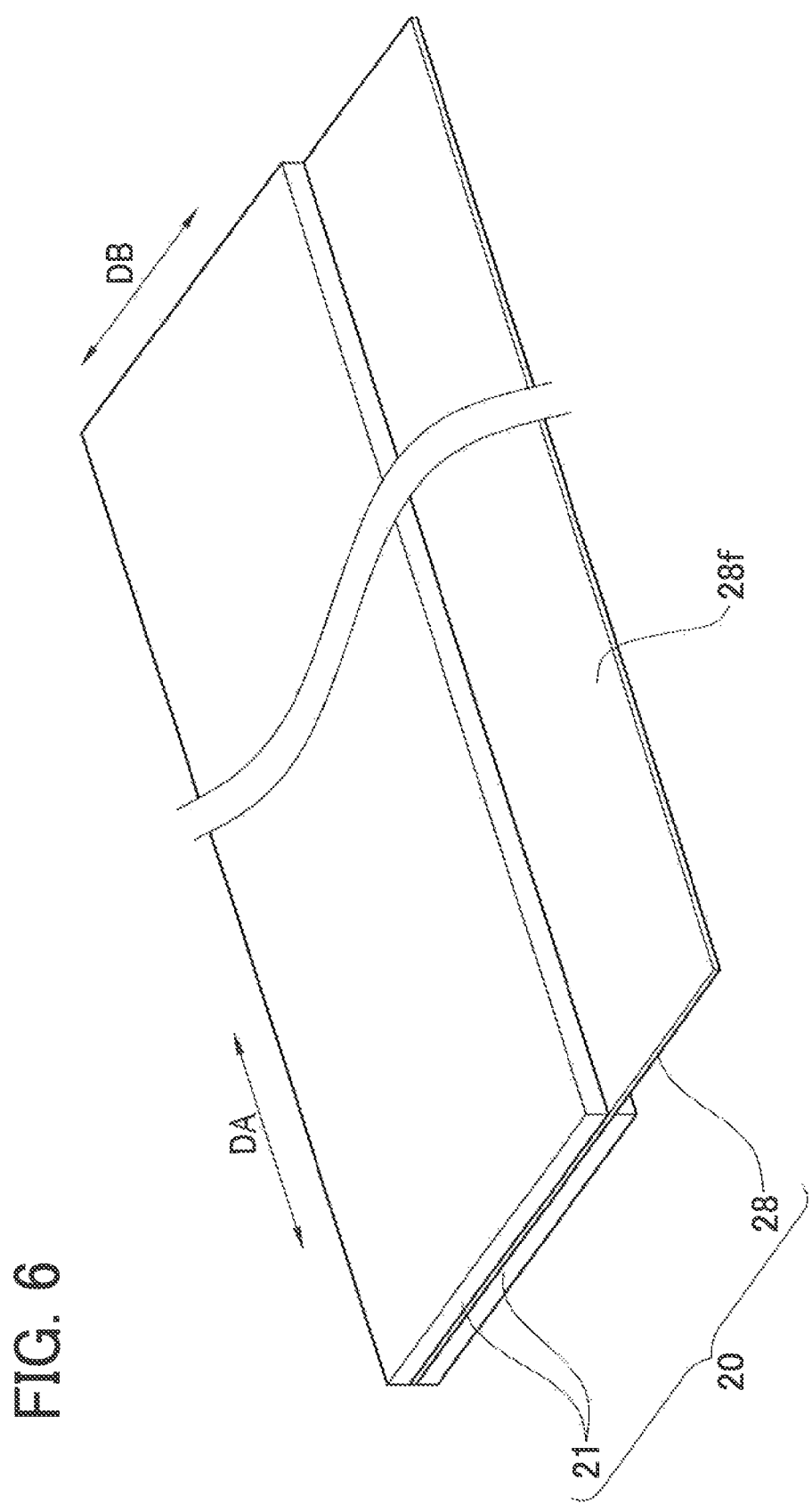
FIG. 6 is a perspective view of a positive electrode sheet in the embodiment (Examples 1 to 6)

The negative electrode sheet 30 of the electrode body 10 carries negative active material layers (not shown) on both surfaces of the strip-shaped negative electrode foil (not shown) excepting the negative lead portions 38f extending along one side or edge. As shown in a perspective view of FIG. 6, the positive electrode sheet 20 includes a positive electrode foil 28 made of aluminum in a strip shape extending in a longitudinal direction DA and two positive active material layers 21, 21 each formed to be placed on only one side in a short-side direction DB (an upper left side in FIG. 6) of the positive electrode foil 28 (both main surfaces of the positive electrode foil 28) and to extend along the longitudinal direction DA of the positive electrode foil 28. Thus, the positive electrode sheet 20 has positive lead portions 28f exposing the positive electrode foil 28 from the positive active material layers 21 on the other side (a lower right side in FIG. 6) in the short-side direction DB of the positive electrode foil 28.

The electrode body 10 includes, as shown in FIG. 2, a positive foil-layered part 11 having an almost oblong shape in cross section in which the positive lead portions 28f of the positive electrode sheet 20 overlap one another in the thickness direction DT of the positive electrode foil 28 on the one side (right in FIG. 2) in the axial direction DX. Furthermore, this positive foil layered part 11 includes a positive foil welded part 12 made by welding the positive electrode foil 28 of the positive lead portions 28f to each other to parallel portions of the oblong shape in the thickness direction DT by ultrasonic welding (see FIGS. 2 to 4).

Figure 3:
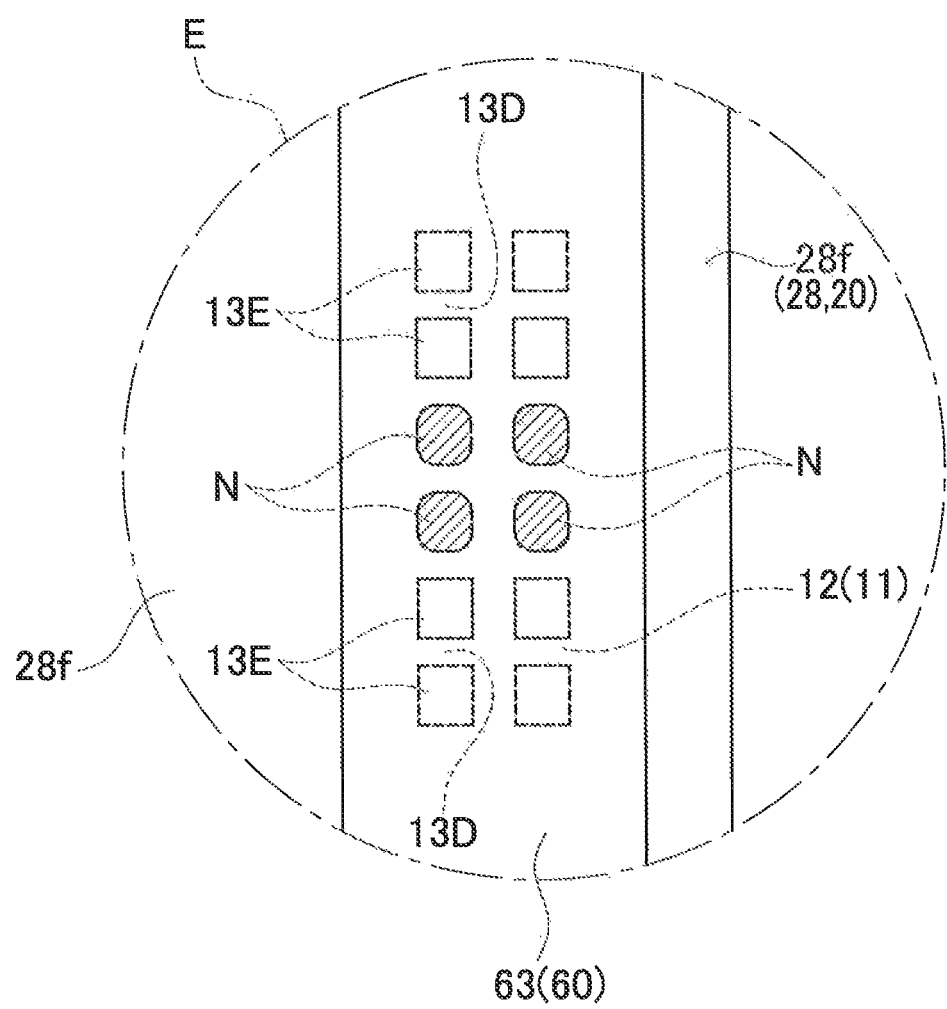
FIG. 3 is an explanatory view (a partial enlarged view of a part E in FIG. 2) of the battery in the embodiment (Examples 1 to 6)

In the battery 1 in Example 1, as shown in FIGS. 3 and 4, the positive foil welded parts 12 of the positive foil layered part 11 and the joining member 63 (joining parts 63Y) of the positive terminal structure 60 are resistance-welded to each other. As shown in FIG. 3 (a partial enlarged view of a part E in FIG. 2) and a cross sectional view of FIG. 5 (a partial enlarged view of a part C in FIG. 4), nuggets N are formed between each positive foil welded part 12 and the joining member 63 (each joining part 63Y) when each foil welded part 12 and the joining member 63 are melted during resistance-welding.

The nuggets N are arranged in a scattered-point pattern (a lattice pattern) in the expanding direction (a parallel direction to the paper sheet of FIG. 3) of the positive electrode foil 28 as shown in FIG. 3. In this battery 1, a maximum size M of each nugget N in the thickness direction DT (a right-left direction in FIG. 4) is 0.30 mm and a thickness size T of the positive foil welded part 12 is 0.60 mm (see FIG. 5).

In the battery 1 in the present embodiment (Example 1), the positive foil welded parts 12 of the positive foil layered part 11 and the joining parts 63Y of the positive terminal structure 60 are joined to each other through the plurality of nuggets N, N arranged in a scattered-point pattern (a lattice pattern) (see FIG. 3). Accordingly, the battery 1 can provide good welding strength between the positive foil layered part 11 and the positive terminal structure 60.

The positive terminal structure 60 and the positive foil welded parts 12 are resistance-welded to each other through the nuggets N generated during the resistance-welding mentioned later. In the positive foil welded parts 12, furthermore, the positive electrode foils 28 of the positive lead portions 28f are welded to each other in the thickness direction DT by ultrasonic welding. Thus, the battery 1 can be provided in which each of the positive electrode foil 28 and the positive terminal structure 60 are electrically connected with low resistance.

Since the positive foil layered part 11 and the positive terminal structure 60 are resistance-welded, the current cutoff mechanism 62 included in the positive terminal structure 60 will not cause any defect (e.g., the generation of deviation in operating pressure) that occurs when the positive foil layered part 11 and the positive terminal structure 60 are ultrasonically welded. Accordingly, the battery 1 capable of reliably cutting off application of electric current to the electrode body 10 according to a rise of internal pressure of the battery case 80.

Figure 7:
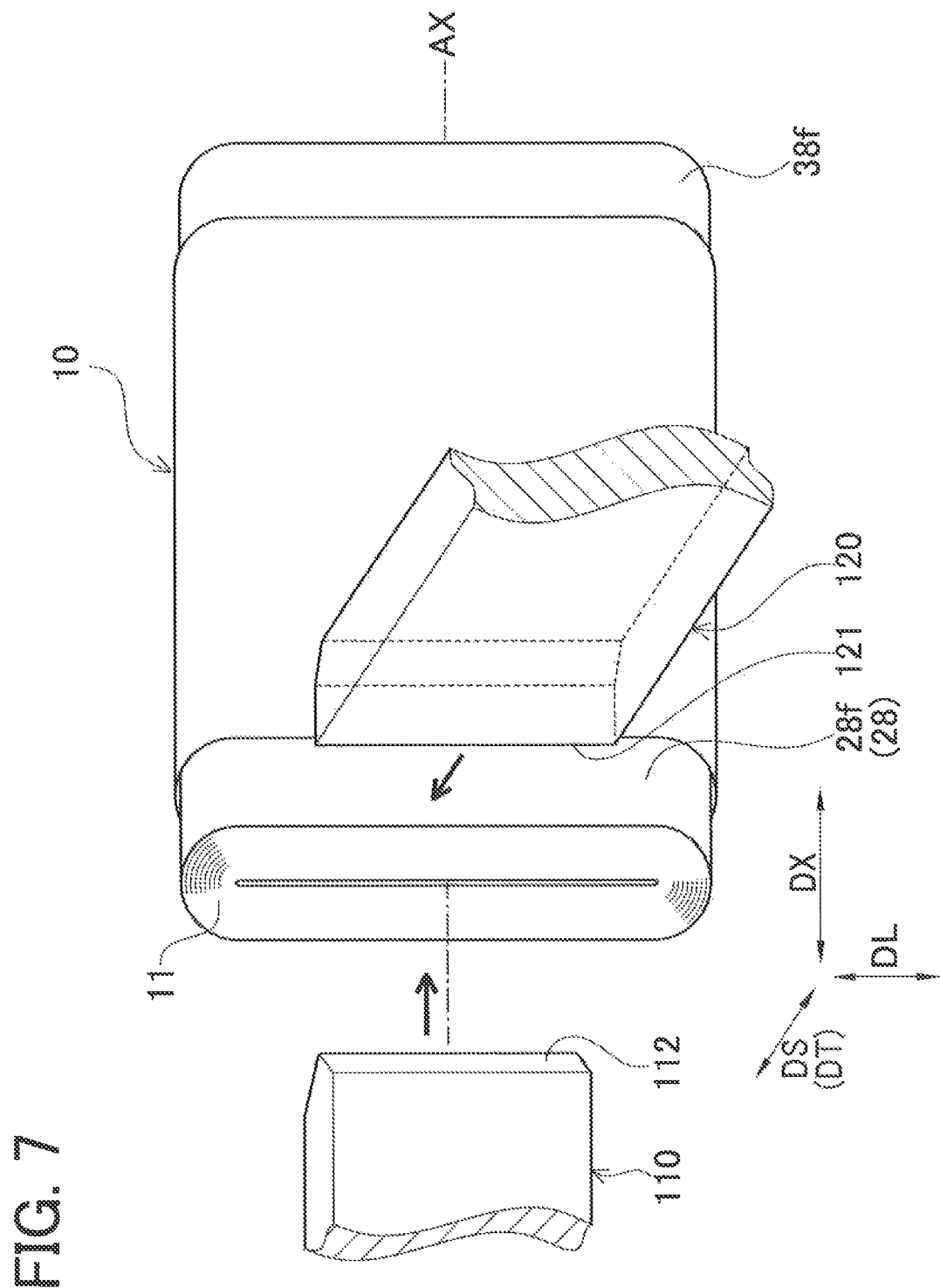
FIG. 7 is an explanatory view of a forming step of a method for producing the battery in the embodiment (Examples 1 to 6)

A method for producing the battery 1 in the present embodiment (Example 1) will be explained, referring to FIG. 7. Firstly, strip-shaped separators are interposed between a strip-shaped positive electrode sheet 20 and a strip-shaped negative electrode sheet 30, each of which is produced by a well-known technique, and this assembly is wound together around a winding axis AX. This winding operation is performed so that the positive lead portions 28f of the positive electrode sheet 20 are placed on one side (a left side in FIG. 7) in the axial direction DX of the winding axis AX and the negative lead portions 38f of the negative electrode sheet 30 is placed on the other side (a right side in FIG. 7) in the axial direction DX. After winding, the assembly is deformed into a flat shape, forming the flat wound electrode body 10 (see FIG. 7). This electrode body 10 includes the positive foil layered part 11 on the other side (the left side in FIG. 7) in the axial direction DX, in which the positive electrode foils 28 of the positive lead portions 28f are overlapped or layered.

A forming step of the method for producing the battery 1 in Example 1 will be explained below. This forming step uses a first block member 110 and a second block member 120. This first block member 110 has a roughly rectangular plate shape partially cut away to form a leading end portion 112 in a triangular prism shape (a blade shape). The second block member 120 has a roughly rectangular plate shape partially cut away in the thickness direction to form a leading end face 121.

Figure 8:
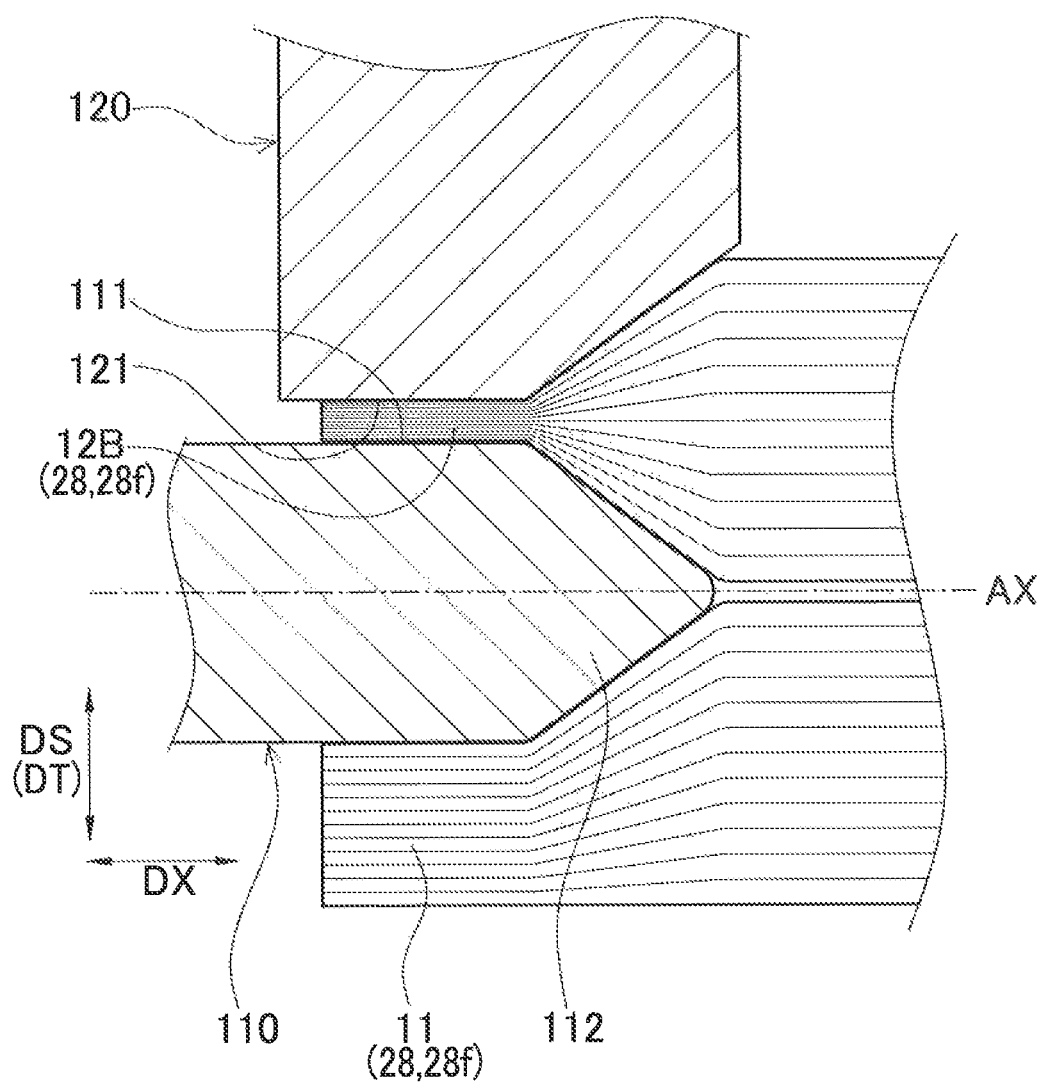
FIG. 8 is another explanatory view of the forming step of the method for producing the battery in the embodiment (Examples 1 to 6)

In this forming step, firstly, the first block member 110 is inserted in the center of the positive foil layered part 11 of the electrode body 10. To be concrete, as shown in FIG. 7, the first block member 110 with the triangular prismatic leading end portion 112 being located on the side facing the electrode body 10 is moved from left to right in FIG. 7 along the winding axis AX. The positive foil layered part 11 is divided into two by the first block member 110 (see FIG. 8). Simultaneously, the second block member 120 is pressed against one of the parallel portions of the oblong positive foil layered part 11 from outside. Specifically, as shown in FIG. 7, the second block member 120 disposed with the above leading end face 121 facing to the parallel portion of the oblong positive foil layered part 11 is moved in a minor diameter direction DS (from lower right to upper left in FIG. 7). Accordingly, in the parallel portion of the positive foil layered part 11, the positive lead portions 28f (a left side in FIG. 8) of the positive electrode foil 28 are clamped between the leading end face 121 of the second block member 120 and a side surface 111 of the first block member 110, thereby forming positive foil vicinity portions 12B reformed to come close to each other in the thickness direction DT (see FIG. 8).

Figure 9:
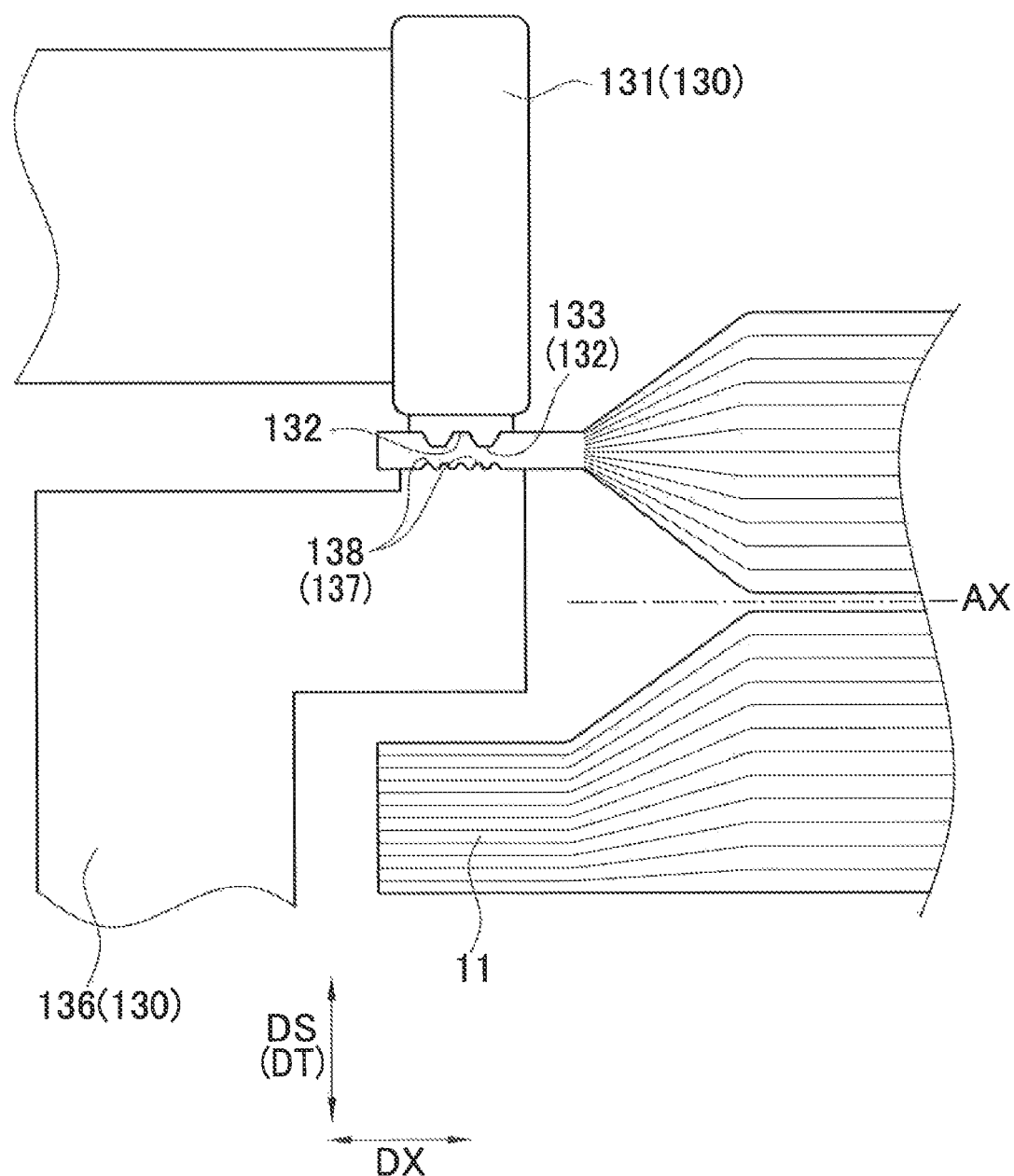
FIG. 9 is another explanatory view of the forming step of the method for producing the battery in the embodiment (Examples 1 to 6)

Successively, the positive electrode foils 28 (the positive lead portions 28f) overlapping one another in the thickness direction DT in the positive foil vicinity portions 12B are subjected to ultrasonic welding. To be concrete, as shown in FIG. 9, an ultrasonic welding device 130 is used in which a horn machining surface 132 of a horn 131 is vibrated in parallel to an anvil machining surface 137 of an anvil 136 placed to face the horn machining surface 132. In the horn machining surface 132 which is a leading surface of the horn 131, a plurality of first protrusions 133 each protruding in a square pyramid-like shape are arranged in a lattice pattern (concretely, 2 rows×6 lines). A pitch between the first protrusions 133, 133 in this horn machining surface 132 is 0.50 mm. On the other hand, in the anvil machining surface 137 of the anvil 136, a plurality of second protrusions 138 each protruding in a square pyramid-like shape are arranged in a lattice pattern (concretely, 5 rows×20 lines). A pitch between the second protrusions 138, 138 in this anvil machining surface 137 is 0.10 mm.

The horn 131 and the anvil 136 of the ultrasonic welding device 130 press the positive foil vicinity portions 12B in the thickness direction DT and further the positive electrode foil 28 of the positive foil vicinity portions 12B is subjected to ultrasonic vibration from the horn 131 and ultrasonic welded. Accordingly, the positive electrode foil 28 are integrally welded to each other in the thickness direction DT to form foil welded parts 12C of the positive foil layered part 11.

Figure 10:
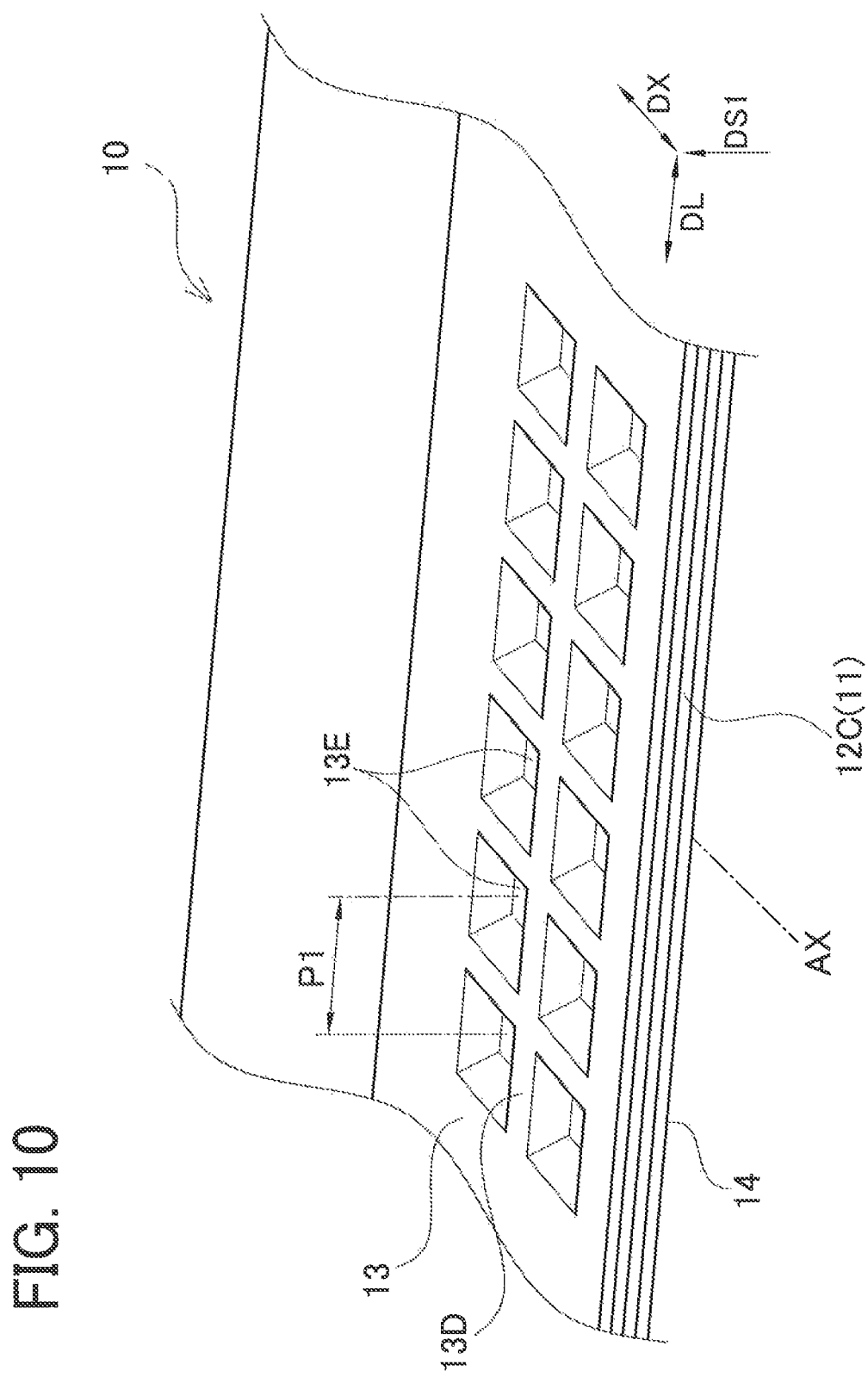
FIG. 10 is a perspective view of a foil welded part of the battery in the embodiment (Examples 1 to 6)

In one of the foil welded parts 12C, as shown in FIG. 10, a first foil welded surface 13 facing on an outer side DS1 in the minor diameter direction (upward in FIG. 10) is formed with first high-position parts 13D located at a high position on the outer side DS1 in the minor diameter direction and first low-position parts 13E at a lower position than the first high-position parts 13D. In the present embodiment, the bottom of each square frustum-shaped recess formed by the first protrusions 133 of the aforementioned horn 131 is referred to as the first low-position part 13E and a portion between the recesses is referred to as the first high-position parts 13D (see FIG. 10).

As shown in FIG. 10, the first high-position parts 13D is located on the same plane as the first foil welded surface 13. The first low-position parts 13E are distributed in a lattice pattern (concretely, 2 lines×6 rows) with a pitch (first pitch P1) of 0.50 mm in the first high-position parts 13D.

Figure 11:
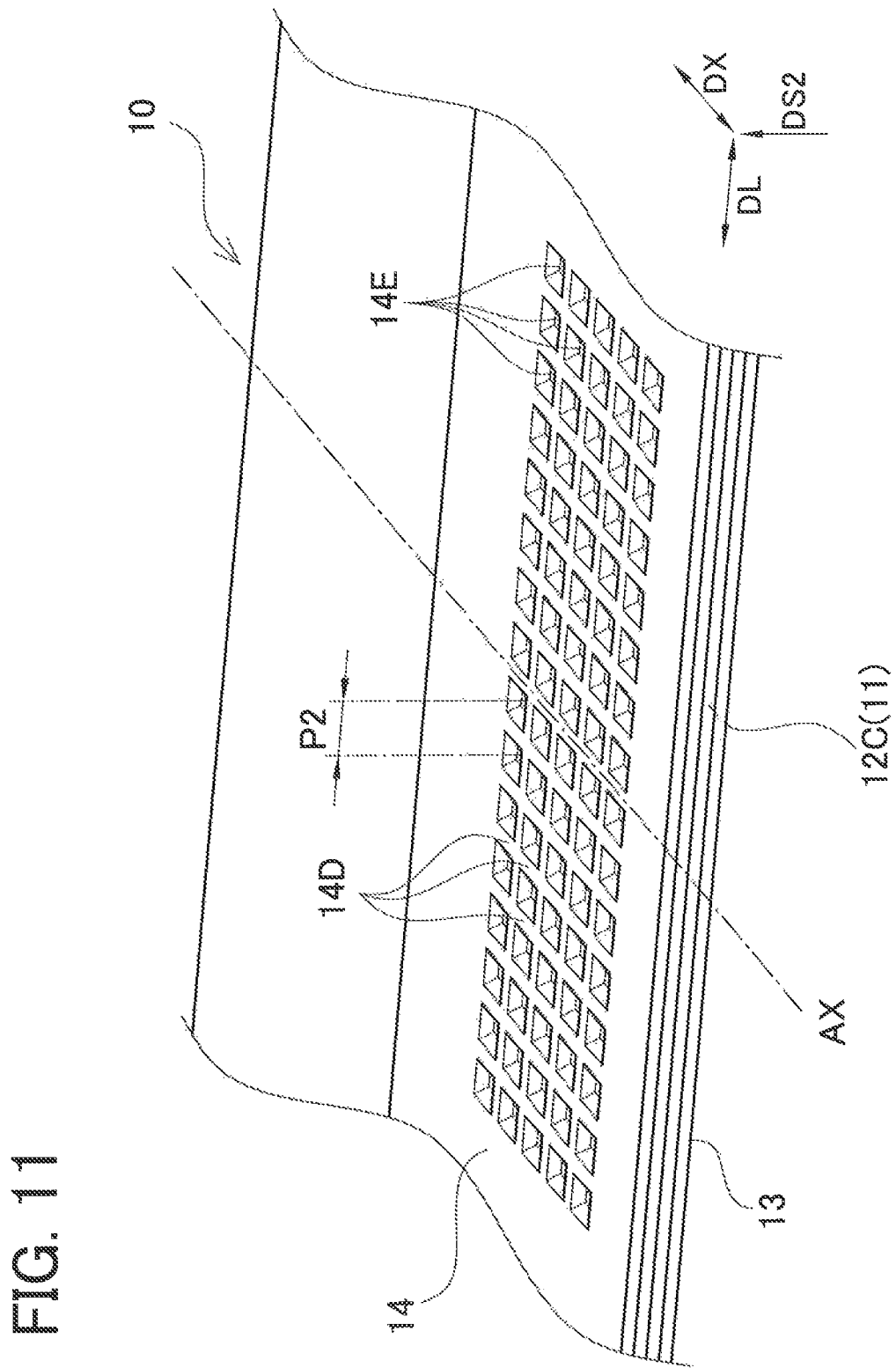
FIG. 11 is another perspective view of the foil welded part of the battery in the embodiment (Examples 1 to 6)

On the other hand, as shown in FIG. 11, in the surface of the foil welded part 12C, a second foil welded surface 14 facing on an inner side DS2 in the minor diameter direction (upward in FIG. 11) is formed with second high-position parts 14D at a high position on the inner side DS2 in the minor diameter direction and second low-position parts 14E at a lower position than the second high-position parts 14D. In the present embodiment, the bottom of each square frustum-shaped recess formed by the second protrusions 138 of the aforementioned anvil 136 is referred to as the second low-position part 14E and a portion between the recesses is referred to as the second high-position parts 14D (see FIG. 11).

As shown in FIG. 11, the second high-position parts 14D is located on the same plane as the second foil welded surface 14. The second low-position parts 14E are distributed in a lattice pattern (concretely, 5 lines×20 rows) with a pitch (second pitch P2) of 0.10 mm in the second high-position parts 14D.

Figure 12:
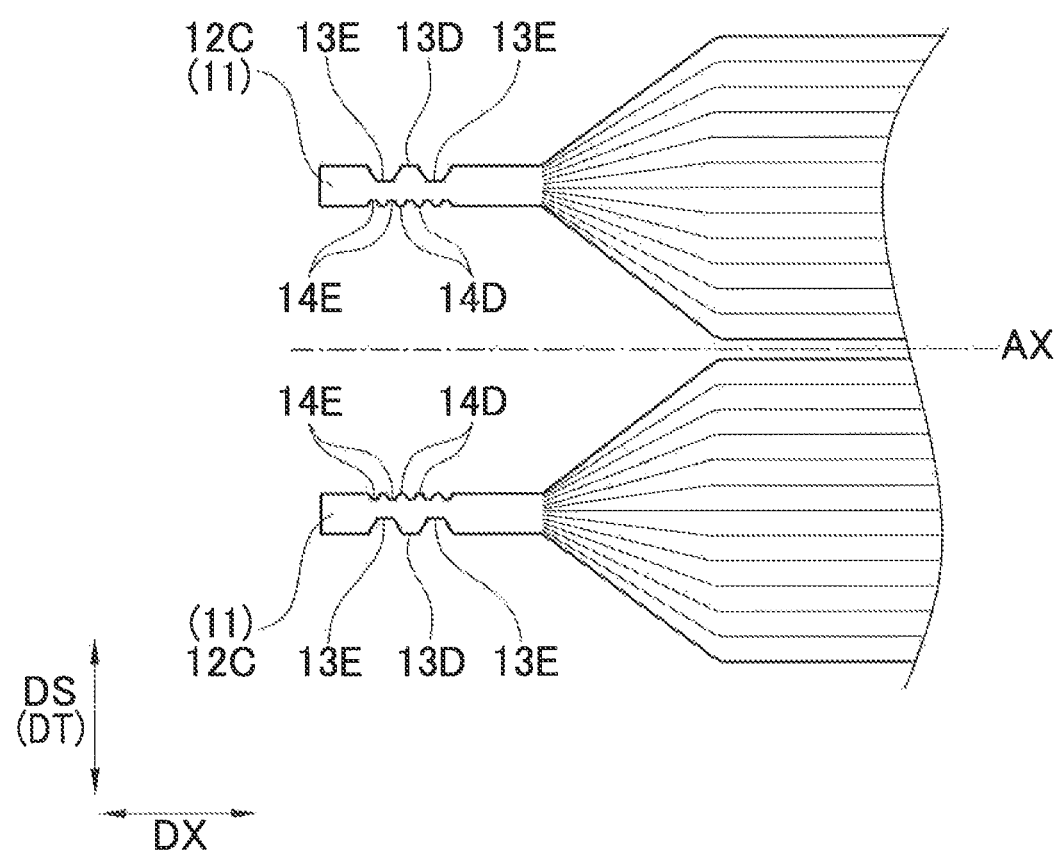
FIG. 12 is an explanatory view of a forming step of the method for producing the battery in the embodiment (Examples 1 to 6)

Subsequently, the other foil welded part 12C is produced in a similar way on the other one of the parallel portions of the oblong positive foil layered part 11. The above manner produces the electrode body 10 formed with the foil welded part 12C in each of the parallel portions of the positive foil layered part 11 divided into two (see FIG. 12).

The resistance-welding step of the method for producing the battery 1 in Example 1 will be explained below. In this resistance-welding step, a known resistance-welding device 140 having the first electrode 141 and the second electrode 146 each made of copper is used. In this resistance-welding device 140, a first electrode surface 142 of the first electrode 141 and a second electrode surface 147 which is a leading surface of the second electrode 146 face each other coaxially (see FIG. 13). Each of the first electrode surface 142 and the second electrode surface 147 has a circular outer circumference shape bulging like a spherical shell.

Figure 13:
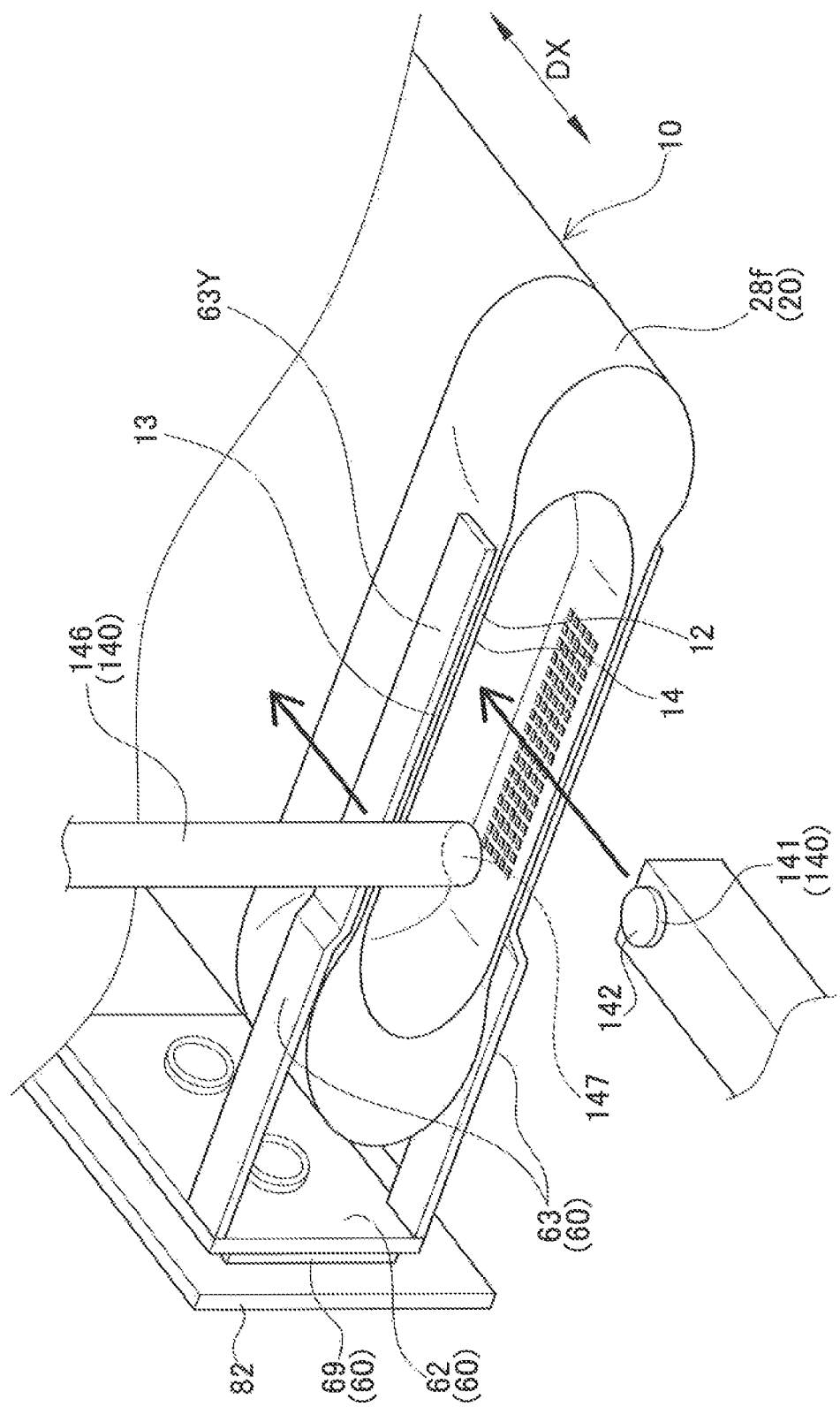
FIG. 13 is an explanatory view of a resistance-welding of the method for producing the battery in the embodiment (Examples 1 to 6)
Figure 14:
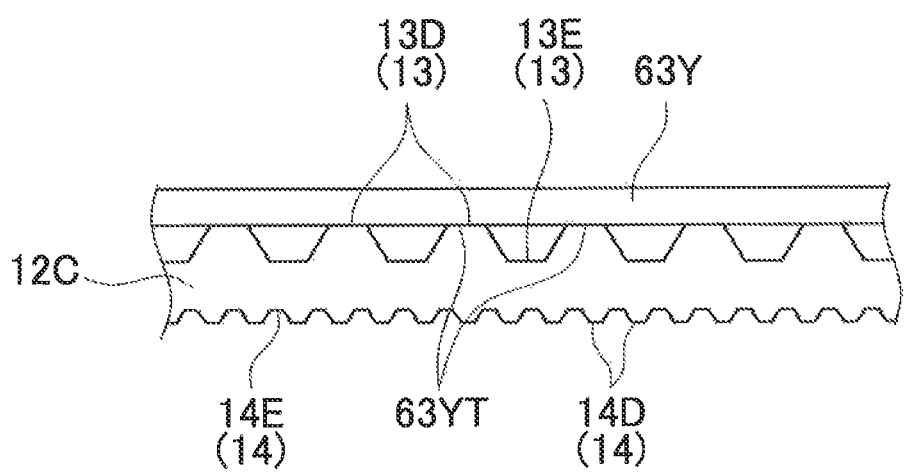
FIG. 14 is another explanatory view of the resistance-welding of the method for producing the battery in the embodiment (Examples 1 to 6)

In the resistance-welding step, the joining parts 63Y of the joining member 63 of the positive terminal structure 60 are placed in contact with the foil welded part 12C of the positive foil layered part 11 of the electrode body 10 (see FIGS. 13 and 14). Specifically, the positive terminal structure 60 having the current cutoff mechanism 62 is assembled in advance to the closing lid 82 by a known technique. One of the two joining parts 63Y, 63Y of the positive terminal structure 60 is placed in contact with the first foil welded surface 13 of one of the two foil welded parts 12C, 12C present in the electrode body 10 (see FIG. 13). Accordingly, as shown in FIG. 14, the first high-position parts 13D of the first foil welded surface 13 of the foil welded part 12C is brought in contact with the joining part 63Y. A portion of the joining part 63Y held in contact with the first high-position parts 13D is referred to as a contact section 63YT.

Figure 15:
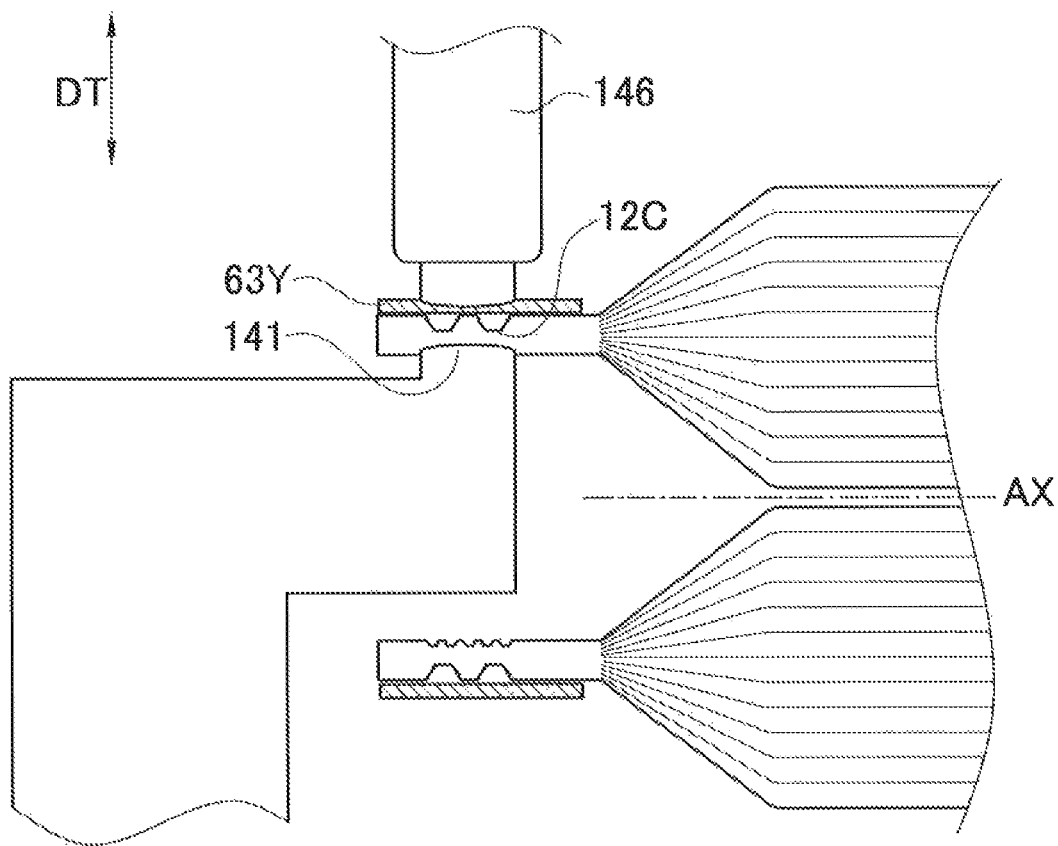
FIG. 15 is another explanatory view of the resistance-welding of the method for producing the battery in the embodiment (Examples 1 to 6)
Figure 16:
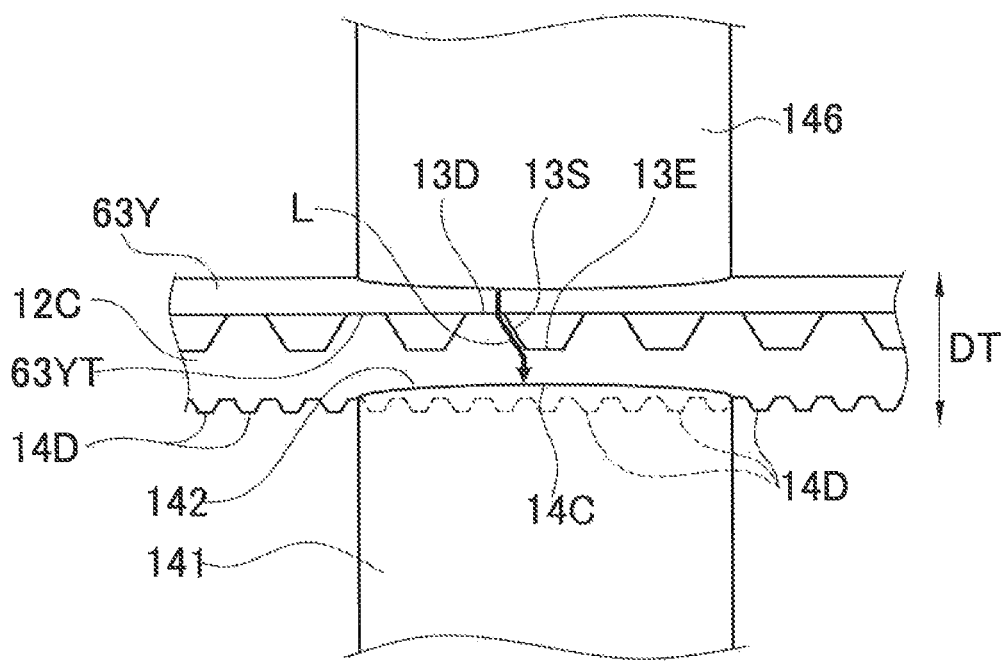
FIG. 16 is another explanatory view of the resistance-welding of the method for producing the battery in the embodiment (Examples 1 to 6).

By use of the aforementioned resistance-welding device 140, the joining parts 63Y of the positive terminal structure 60 are resistance-welded to the foil welded part 12C in contact therewith. To be concrete, the first electrode 141 of the resistance-welding device 140 is disposed on the side facing the second foil welded surface 14 of the foil welded part 12C, and the second electrode 146 is disposed on the side facing the joining part 63Y of the positive terminal structure 60 (see FIG. 15). The foil welded part 12C and the joining part 63Y are clamped under pressure in the thickness direction DT of the positive electrode foil 28 by the first electrode 141 and the second electrode 146. FIG. 16 is a cross sectional view showing a state where the foil welded part 12C and the joining part 63Y are clamped under pressure between the first electrode 141 and the second electrode 146. By this pressure-clamping using the first electrode 141 and the second electrode 146, the first high-position parts 13D comes into pressure contact with the joining part 63Y (contact section 63YT). In this state, electric current is applied between the first electrode 141 and the second electrode 146 to resistance weld the foil welded part 12C and the joining part 63Y.

However, in the aforementioned forming step, in the first high-position parts 13D of the foil welded part 12C, the positive electrode foils 28, 28 are not so strongly pressed in contact with each other in the height direction (thickness direction DT of the positive electrode foil 28) as compared with the first low-position part 13E, and are not overlapped in tight contact fashion. Therefore, when electric current is applied between the first electrode 141 and the second electrode 146, the inside of the first high-position parts 13D is relatively difficult to allow the electric current to pass through. Thus, it is conceived that the electric current flowing in the first high-position parts 13D does not travel through the inside of the first high-position parts 13D in the thickness direction DT, but travels to the first low-position part 13E through the positive electrode foil 28 forming the slant surface 13S located between the first high-position part 13D and the first low-position part 13E, and travels in the first low-position part 13E in the thickness direction DT (or travels back in this route). A route L along which the electric current travels is indicated by an arrow in FIG. 16. During resistance-welding, therefore, the electric current flows with concentration on the slant surface 13S around the first low-position part 13E, thereby melting the slant surface 13S and the first low-position part 13E.

When the first high-position parts 13D is brought in pressure contact with the joining part 63Y, the first high-position parts 13D is pressed in the thickness direction DT, thinning each of the layered positive electrode foils 28, 28 forming the first high-position parts 13D, while material (aluminum) is extruded by just that much outward in the expanding direction (right-left direction in FIG. 16) from the first high-position parts 13D. The extruded aluminum is melted in the aforementioned slant surface 13S.

On the other hand, by pressure-clamping using the first electrode 141 and the second electrode 146, the second high-position parts 14D of the second foil welded surface 14 having a smaller pitch than that of the first foil welded surface 13 is collapsed or squashed under pressure by the first electrode surface 142 of the first electrode 141 in the thickness direction DT (see FIG. 16). Thus, the oxidation layer coating each of the high-position parts 14D is broken, allowing aluminum (newly-formed surface) to be exposed from a plurality of portions of the surface (the deformed surface 14C). This reduces the contact resistance between the first electrode 141 and the second foil welded surface 14, suppressing heat generation in this area, thereby preventing welding between the foil welded part 12C (the second foil welded surface 14) and the first electrode 141.

Figure 5:
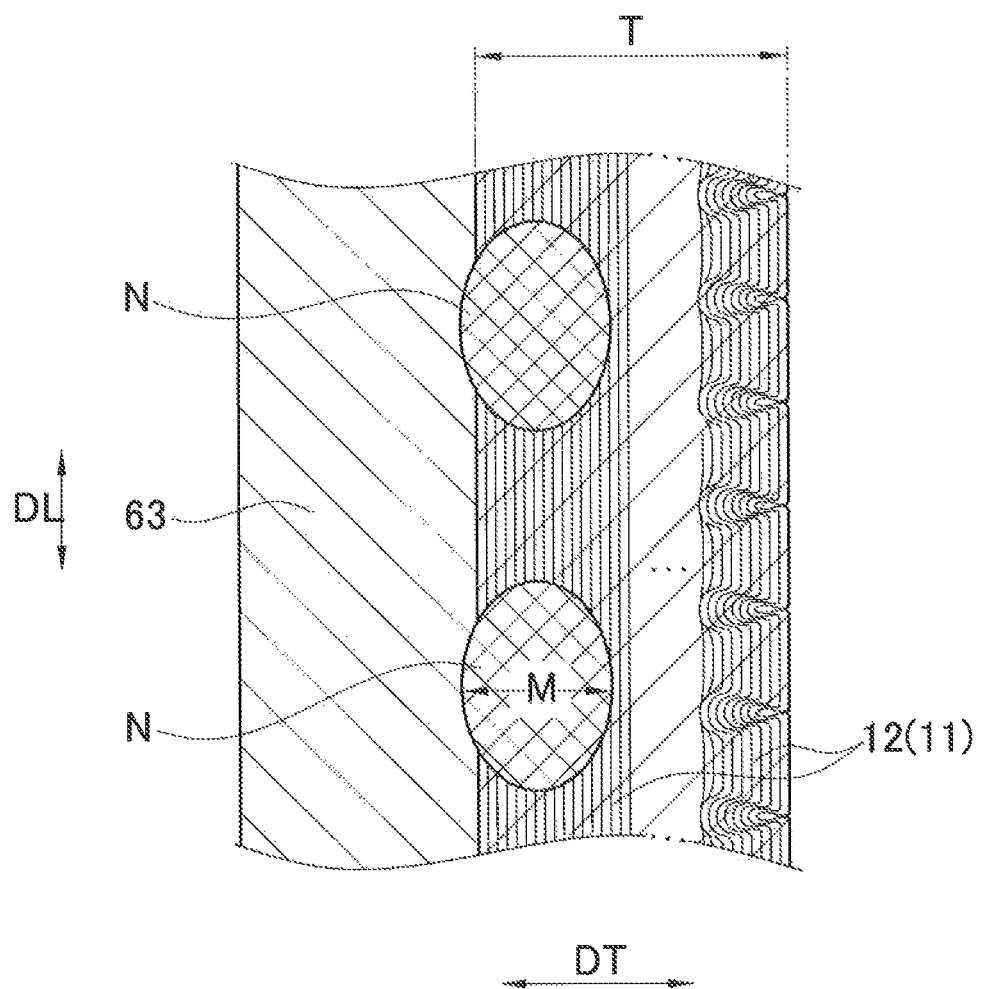
FIG. 5 is a partial enlarged cross sectional view (a part C in FIG. 4) in the battery in the embodiment (Examples 1 to 6)

In the above way, in the resistance-welding step of the method for producing the battery 1 in Example 1, it is possible to prevent melting of the second foil welded surface 14 of the foil welded part 12C, thereby reliably performing the resistance-welding between the positive foil welded part 12 and the positive terminal structure 60 (see FIGS. 3 and 5).

The other one of the positive terminal structure 60 and the joining part 63Y is resistance-welded to the foil welded part 12C in a similar way to above. Thus, the electrode body 10 is produced in which the positive terminal structure 60 is joined to the positive foil layered part 11 (the positive foil welded part 12).

On the other hand, the negative terminal structure 70 (the negative inner terminal member 71) assembled to the closing lid 82 by a known technique is joined (resistance-welded) to the negative electrode sheet 30 (negative lead portions 38f) of the electrode body 10. Thereafter, the electrode body 10 integral with the closing lid 82, the positive terminal structure 60, and the negative terminal structure 70 is set in the case body 81. The case body 81 and the closing lid 82 are tightly joined to each other by laser welding. An electrolyte is injected in the battery case 80 through a liquid port not shown, and then the liquid port is sealingly closed. The battery 1 in Example 1 is thus completed (see FIG. 1).

Meanwhile, a welding state of the electrode body 10 and the positive terminal structure 60 in the battery 1 in Example 1 was investigated. To be concrete, the welding strength (tensile strength in a shearing direction) between the positive foil layered part 11 (positive foil welded part 12) of the electrode body 10 and each joining part 63Y of the positive terminal structure 60 resistance-welded thereto was measured by use of a known tensile test. Results thereof are shown in Table 1. In this Table 1, a mark "○" in the field of weld state indicates a welding strength (tensile strength) of equal to or higher than 200 N, a mark "Δ" indicates a welding strength of equal to or hither than 150 N but less than 200 N, and a mark "x" indicates a welding strength of less than 150 N.

TABLE

| Battery | P1 (mm) | P2 (mm) | T (mm) | Max. Size M (mm) of Nugget N | Welding Strength | M/T | Notes |
| --- | --- | --- | --- | --- | --- | --- | --- |
| Example 2 | 0.15 | 0.10 | 0.60 | 0.10 | Δ | 0.17 | |
| Example 3 | 0.22 | | | 0.15 | ○ | 0.25 | |
| Example 1 (Battery 1) | 0.50 | | | 0.30 | ○ | 0.50 | |
| Example 4 | 0.67 | | | 0.45 | ○ | 0.75 | |
| Example 5 | 0.83 | | | 0.50 | ○ | 0.83 | A small amount of molten Al is expelled from nugget |
| Example 6 | 0.92 | | | 0.55 | ○ | 0.92 | A small amount of molten Al is expelled from nugget |
| Comparative Example | — | — | 0.60 | 1.20 | x-○ | 2.00 | A large amount of molten Al is expelled from nugget |

Further, an observation using an optical microscope was made on the battery 1, i.e., a cut cross-section of the positive foil layered part 11 (positive foil welded part 12) and the joining part 63Y along the thickness direction DT of the positive electrode foil 28. A maximum size M of a nugget N in the electrode body DT is 0.30 mm. A thickness T of the positive foil welded part 12 is 0.60 mm.

For comparison with the above battery 1, the present inventors produced a plurality of batteries each formed with a foil welded part different only in the first pitch P1 between the first low-position parts from the battery 1 in the aforementioned forming step. To be concrete, in the forming step, a horn having a horn machining surface with a 0.15-mm pitch between the first protrusions was used to form a foil welded part with the first pitch P1 of 0.15 mm in the positive foil layered part of each electrode body. Thereafter, the resistance-welding step similar to the battery 1 in Example 1 was performed to form a battery (a battery in Example 2). In a similar manner to the battery in Example 2, each battery (batteries in Examples 3 to 6) was produced by using foil welded parts respectively having the first pitches of 0.22 mm, 0.67 mm, 0.83 mm, and 0.92 mm. In each of the batteries in Examples 2 to 6, similar to the battery in Example 1, a second pitch P2 between the second low-position parts is 0.10. mm and a thickness T of the positive foil layered part is 0.60 mm (see Table 1).

On the other hand, the foil welded parts are formed in which the first high-position parts and the first low-position parts are not formed in the first foil welded surface and the second high-position parts and the second low-position parts are not formed in the second foil welded surface. Then, the resistance-welding step as in Example 1 and others is performed to produce batteries (batteries in Comparative example). The thickness T of this positive foil layered part is 0.60 mm as in Examples 1 to 6 (see Table 1).

As with the battery 1, each battery of Examples 2 to 6 and Comparative example was subjected to measurement of the welding strength (tensile strength) between the foil welded part and the joining part 63Y and the maximum size M of each nugget N in the thickness direction DT. Furthermore, a ratio M/T was calculated by dividing the maximum size M of each nugget N by the thickness T of the positive foil layered part. Each measurement result is shown in Table 1.

Table 1 reveals that as the first pitch P1 is larger, the maximum size M of each nugget N in the thickness direction DT is also larger. The reason thereof is conceived as below. That is, since each of the first low-position parts of the first foil welded surface is the bottom of a square frustum shape, the number of the first low-position parts covered by the positive terminal structure 60 (the joining part 63Y) is smaller as the first pitch P1 is larger. Therefore, during resistance-welding, large electric current (power) concentrates on one of the first low-position parts. This melts more aluminum in the slant surface between the first high-position part and the first low-position part and also in the first low-position part.

Of each battery in Examples 1 to 6, excepting the battery in Example 2 having the welding strength indicated by "Δ", other batteries in Examples 1 and 3 to 6 have the welding strength indicated by "○". On the other hand, the battery in Comparative example is "x". From this result, in view of a relationship between the ratio M/T and the welding strength, the tensile strength is equal to or higher than 200 N for the ratio M/T of 0.20 or higher, ensuring sufficient welding strength. In contrast, the battery in Example 2 having the ratio M/T being less than 0.20 (concretely, 0.17) is slightly deteriorated in welding strength. This reveals that the first pitch P1 of the first low-position parts is preferred to be equal to or higher than 0.20 mm.

On the other hand, each battery in Examples 5 and 6 of the batteries in Examples 1 to 6, nuggets N are formed with a large size M during resistance-welding and also a small amount of aluminum is expelled from each nugget N. As shown in Table 1, the values M/T in the batteries in Examples 5 and 6 are respectively 0.83 and 0.92, which are larger than those of the batteries in Examples 1 to 4. In each of the batteries in Examples 5 and 6, conceivably, the nuggets N are too large, resulting in a decreased thickness of remaining positive foil welded part, thereby causing part of molten aluminum forming the nuggets N to be expelled from the positive foil welded part. However, the welding strength of each battery in Examples 5 and 6 can be ensured at the same level as that of each battery in Examples 2 to 4 (see FIG. 1). Since only a small amount of the molten aluminum forming the nuggets N is expelled, the welding strength as a whole is conceived to be sufficiently ensured. In Comparative example mentioned later, on the other hand, the maximum size M is too large, causing most of the molten aluminum in the nuggets N to be expelled out, so that the nuggets N partially become voids (holes). It is found from the above that the ratio M/T is preferably set to be equal to or lower than 0.95 and the first pitch P1 is set to be equal to or lower than 0.95 mm. Furthermore, the ratio M/T set to be equal to or lower than 0.80 (that is, the first pitch P1 is equal to or lower than 0.75 mm) enables reliably suppressing expulsion of molten aluminum during resistance-welding and thus is more preferable.

As Comparative example, a plurality of batteries (n=10) were produced in which the joining part 63Y of the positive terminal structure 60 is resistance-welded to the foil welded part to which the positive electrode foil is ultrasonic welded in the thickness direction under the same welding conditions as those in Examples 1 to 6 mentioned above without forming the first high-position parts, first low-position parts, second high-position parts, and second low-position parts in the first foil welded surface and the second foil welded surface which thus have flat surfaces. These batteries in Comparative example were respectively subjected to measurement of welding strength between the positive foil welded part and the joining part 63Y in a similar way to the batteries in Examples 1 to 6. From this measurement, it is revealed that the batteries in Comparative example include batteries (5 batteries/10 batteries) satisfying the condition that the welding strength indicated by the mark "○", that is, the maximum size M of each nugget N is 1.2 mm (the ratio M/T=2.00 at that time) and 200 N or higher, whereas batteries (5 batteries/10 batteries) indicated with the mark "x", that is, the welding strength of less than 150 N are also present, so that the welding strength of resistance-welding is unstable varying from "○" to "x". In the battery with the welding strength with the mark "x", a large amount of aluminum is expelled and voids occur in the positive foil welded part. Thus, the positive foil welded part and the joining part 63Y of the positive terminal structure 60 are substantially not joined.

This results from the following reasons. Since the contact surfaces of the positive foil welded part and the joining part 63Y of the positive terminal structure 60 are flat surfaces, electric current is liable to flow with concentration on one portion from which the oxidation coating is initially broken, so that a large nugget N is likely to be formed in this portion. When the molten aluminum is not expelled from the nuggets N, the battery provides good welding strength (mark "○"). On the other hand, when a large amount of molten aluminum is expelled from the nuggets N and part of the nuggets N become voids (holes), conceivably, the battery provides low welding strength (mark "x").

In the resistance-welding step of the method for producing the battery 1 in the present embodiment, the first high-position parts 13D of the foil welded part 12C are placed in contact with the positive terminal structure 60 (the joining part 63Y) and electric current is applied thereto, thereby forming nuggets N in each of the first low-position parts. Accordingly, the nuggets N generated between the positive foil welded part 12 and the positive terminal structure 60 join the positive foil layered part 11 to the positive terminal structure 60 at multiple points. Thus, the molten aluminum is less likely to be expelled from the nuggets N and, even if expelled, it is restricted to only a small amount. This can produce the battery 1 (and each battery in Examples 2 to 6) can be produced by, even though resistance-welding, ensuring good welding strength between the positive foil layered part 11 and the positive terminal structure 60.

In the aforementioned resistance-welding step, when the second high-position parts 14D are collapsed or squashed under pressure in the thickness direction DT by the first electrode 141, the oxide layer coating the second high-position parts 14D is broken, causing aluminum (newly-formed surface) to be exposed in the surface (deformed surface 14C). Accordingly, the contact resistance between the first electrode 141 and the second foil welded surface 14 is reduced and further they are joined at multiple points, allowing electric current to be dispersed, thus causing less heat generation. Therefore, the battery 1 (and each battery in Examples 2 to 6) can be easily produced while preventing welding between the first electrode 141 and the positive foil welded part 12.

In each of Examples 1 to 6, a plurality of first low-position parts 13E, 13E are arranged in a lattice pattern within the first high-position parts 13D, and a plurality of second low-position parts 14E, 14E are arranged in a lattice pattern within the second high-position parts 14D. In addition, the second pitch P2 of the second low-position parts 14E is set to be smaller than the first pitch P1. When resistance-welding is to be performed using the first electrode surface 142 and the second electrode surface 147 which are the same in shape to clamp, the second high-position parts 14D are more easily deformed (compressed) in the thickness direction DT than the first high-position parts 13D. Consequently, the newly-formed surface is exposed in the second foil welded surface 14 and the heat generation in this portion can be suppressed, thereby enabling reliably preventing welding between the first electrode surface 142 and the second foil welded surface 14.

In the method for producing the battery 1 in Example 1 and each battery in Examples 3 and 4, the aforementioned ratio M/T is set to be equal to or higher than 0.20 and thus the battery (battery 1) having good welding strength can be produced. Since the ratio M/T is set to be equal to or lower than 0.80, the battery (battery 1) can be produced by reliably suppressing expulsion of aluminum melted during resistance-welding. In each of the aforementioned batteries (battery 1), the ratio M/T is set to be equal to or higher than 0.20. Thus, the battery (battery 1) having good welding strength can be produced. Furthermore, since the ratio M/T is set to be equal to or lower than 0.80, the battery (battery 1) can be produced by reliably suppressing expulsion of aluminum melted during resistance-welding.

For the battery having the current cutoff mechanism 62 in the positive terminal structure 60, when the positive foil layered part 11 (the foil welded part 12C) of the electrode body 10 and the positive terminal structure 60 are ultrasonic welded to each other, the ultrasonic vibration also transmits to the current cutoff mechanism 62 of the positive terminal structure 60. Accordingly, the current cutoff mechanism 62 is operated by the ultrasonic vibration, the member forming the current cutoff mechanism 62 is deformed, which may cause defects such as a deviation of the operating pressure of the current cutoff mechanism 62 from a desired value.

In the method for producing the battery 1 and others in each example, in contrast, the resistance-welding is used to weld the positive terminal structure 60 to the foil welded part 12C of the electrode body 10, so that the ultrasonic vibration does not transmit to the current cutoff mechanism 62 of the positive terminal structure 60. This can produce the battery 1 and others each having the current cutoff mechanism 62 in the positive terminal structure 60 with good yield.

Although the invention is explained above along the embodiment (Examples 1 to 6), the invention is not limited to the above embodiment and others and may be embodied in other specific forms without departing from the essential characteristics thereof.

For instance, in Example 1 and others, each first low-position part is designed as a bottom of a square frustum-shaped recess. However, it may be designed as a conical recess, and a polygonal pyramid-shaped recess such as pyramid (square pyramid). Furthermore, the second low-position part is configured to be the same as the first low-position part (the bottom of a square frustum). As an alternative, it may be configured to be different from the first low-position part. The above exemplified configuration shows that a plurality of first low-position parts are distributed in a lattice pattern within the first high-position parts. As an alternative configuration, the plurality of first low-position parts may be distributed in a radial pattern. The above exemplified configuration shows that a plurality of second low-position parts are distributed in a lattice pattern within the second high-position parts. Another configuration that the plurality of second low-position parts are distributed in a radial pattern may also be adopted.

Example 1 and others show the forming step in which the horn machining surface 132 of the horn 131 used for ultrasonic welding is made with projections and depressions (uneven surface), the positive electrode foil 28 forming the positive foil layered part 11 are welded to each other by ultrasonic welding and simultaneously the foil welded part 12C is formed in which the first high-position parts 13D and a plurality of first low-position parts 13E are formed in the first foil welded surface (to-be-joined surface). However, for example, another step may be adopted in which the positive electrode foil forming the foil layered part are welded to each other by ultrasonic welding to form the foil welded part and then the first high-position parts and a plurality of the first low-position parts are formed on a to-be-joined surface by press or other technique. Furthermore, the foil welded part is formed in which the first high-position parts 13D and the first low-position parts 13E are formed in the first foil welded surface (to-be-joined surface) 13 and simultaneously the second high-position parts 14D and the second low-position parts 14E are formed in the second foil welded surface (electrode-side surface) 14. As an alternative, it may be arranged such that the first high-position parts and a plurality of first low-position parts are formed in a to-be-joined surface and then the second high-position parts and a plurality of second low-position parts are formed on an electrode-side surface. Reversely, it may be arranged such that the second high-position parts and the second low-position parts are formed in the electrode-side surface and then the first high-position parts and the first low-position parts are formed in the to-be-joined surface.

REFERENCE SIGNS LIST

1 Battery (Sealed battery)
10 Electrode body
11 Positive foil layered part (Foil layered part)
12 Positive foil welded part (Foil welded part)
12C Foil welded part (Foil welded part formed with first high-position part and first low-position part)
13 First foil welded surface (To-be-joined surface)
13 First high-position part
13E First low-position part
14 Second foil welded surface (Electrode-side surface)
14D Second high-position part
14E Second low-position part
20 Positive electrode sheet
28 Positive electrode foil (Aluminum foil)
28f Positive lead portion (Foil exposed portion)
60 Positive terminal structure (Positive terminal member)
62 Current cutoff mechanism (Pressure-type current cutoff mechanism)

63YT Contact section
80 Battery case
141 First electrode (Electrode for resistance-welding)
DL Major diameter direction (Expanding direction)
DS1 Outer side in minor diameter direction (One side in thickness direction)
DS2 Inner side in minor diameter direction (The other side in thickness direction)
DT Thickness direction
DX Axial direction (Expanding direction)
M Maximum size (in thickness direction of nugget)
N Nugget
P1 First pitch
P2 Second pitch
T Thickness (of foil layered part)

The invention claimed is:

1. A method for producing a battery including:
an electrode body including a positive electrode sheet having an aluminum foil, the positive electrode sheet including a foil layered part formed of a foil exposed portions exposing the aluminum foil, the foil exposed portions being overlapped in a thickness direction; and
a positive terminal member made of aluminum and resistance-welded to the foil layered part,
the foil layered part and the positive terminal member being joined to each other through a plurality of nuggets distributed in a scattered-point pattern in an expanding direction of the aluminum foil,
wherein the method includes:
a forming step of forming, in the foil layered part, a foil welded part made of an aluminum foil overlapped and welded to each other in the thickness direction by ultrasonic welding, the foil welded part being formed with a first high-position part located at a high position on one side in the thickness direction and a plurality of low-position parts positioned at a lower position than the first high-position part, the low-position parts being distributed in a scattered-point pattern within the first high-position part, in at least part of a to-be-joined surface on the one side in the thickness direction of surfaces of the foil welded part; and
a resistance-welding step of placing the first high-position part into contact with the positive terminal member, applying electric current to the terminal member to generate the nugget in the first low-position part, and resistance-welding the foil welded part of the electrode body and the terminal member through the nugget.

2. The method for producing a battery according to claim 1,
wherein the forming step includes forming the foil welded part formed with second high-position parts located at a high position on the other side in the thickness direction and a plurality of second low-position parts formed at a lower position than the second high-position part, the second low-position parts being distributed in a scattered-point pattern within the second high-position parts, in at least part of an electrode-side surface positioned on the other side in the thickness direction of the surfaces of the foil welded part, an electrode for resistance-welding being placed in contact with the electrode-side surface, and
the resistance-welding step includes pressure collapsing the second high-position parts in the thickness direction by the resistance-welding electrode.

3. The method for producing a battery according to claim 2,
wherein the plurality of first low-position parts are arranged in a lattice pattern within the first high-position parts,
the plurality of second low-position parts are arranged in a lattice pattern within the second high-position part, and
a second pitch between the second low-position parts is smaller than a first pitch between the first low-position parts.

4. The method for producing a battery according to claim 1,
wherein the battery has a ratio M/T in a range of 0.20 to 0.80,
where a maximum size in the thickness direction of the nugget is M and a thickness of the foil layered part is T.

5. The method for producing a battery according to claim 1,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

6. The method for producing a battery according to claim 2,
wherein the battery has a ratio M/T in a range of 0.20 to 0.80,
where a maximum size in the thickness direction of the nugget is M and a thickness of the foil layered part is T.

7. The method for producing a battery according to claim 3,
wherein the battery has a ratio M/T in a range of 0.20 to 0.80,
where a maximum size in the thickness direction of the nugget is M and a thickness of the foil layered part is T.

8. The method for producing a battery according to claim 2,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

9. The method for producing a battery according to claim 3,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

10. The method for producing a battery according to claim 4,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

11. The method for producing a battery according to claim 6,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

12. The method for producing a battery according to claim 7,
wherein the battery is a sealed battery including the electrode body hermetically sealed in a battery case, and
the positive terminal member includes a pressure-type current cutoff mechanism configured to cut off flow of electric current to the electrode body when internal pressure of the battery case rises.

* * * * *